US012707152B2

(12) United States Patent
Shin et al.

(10) Patent No.: US 12,707,152 B2
(45) Date of Patent: Aug. 11, 2026

(54) METHOD FOR PROVIDING IMAGE, AND ELECTRONIC DEVICE FOR SUPPORTING SAME

(71) Applicant: SAMSUNG ELECTRONICS CO., LTD., Suwon-si (KR)

(72) Inventors: Jongkeun Shin, Suwon-si (KR); Jugun Park, Suwon-si (KR); Dongwon Yeo, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 10 days.

(21) Appl. No.: 18/754,896

(22) Filed: Jun. 26, 2024

(65) Prior Publication Data

US 2024/0348936 A1 Oct. 17, 2024

Related U.S. Application Data

(63) Continuation of application No. PCT/KR2023/000169, filed on Jan. 4, 2023.

(30) Foreign Application Priority Data

Jan. 27, 2022 (KR) ........................ 10-2022-0012537
Feb. 8, 2022 (KR) ........................ 10-2022-0016487

(51) Int. Cl.
*H04N 23/73* (2023.01)
*G06V 10/26* (2022.01)
(Continued)

(52) U.S. Cl.
CPC ............. *H04N 23/73* (2023.01); *G06V 10/26* (2022.01); *H04N 23/611* (2023.01); *H04N 23/71* (2023.01)

(58) Field of Classification Search
CPC ........ H04N 23/73; H04N 23/71; H04N 23/61; H04N 23/70; H04N 23/72; H04N 23/57;
(Continued)

(56) References Cited

U.S. PATENT DOCUMENTS 8,930,848 B2 * 1/2015 Lim ...................... G06F 3/0488 715/767
2003/0071908 A1 4/2003 Sannoh et al.
(Continued)

FOREIGN PATENT DOCUMENTS

CN 108234894 A * 6/2018 ............. H04N 23/62
CN 110086980 A * 8/2019 ............. H04N 25/79
(Continued)

OTHER PUBLICATIONS

International Search Report and Written Opinion for International Application No. PCT/KR2023/000169; International Filing Date Jan. 4, 2023; Date of Mailing Apr. 4, 2023, 10 Pages.
(Continued)

*Primary Examiner* — Lin Ye
*Assistant Examiner* — Steven Daniel Barry
(74) *Attorney, Agent, or Firm* — CANTOR COLBURN LLP

(57) ABSTRACT

An electronic device according to various embodiments of the present disclosure includes a camera, a processor, and memory storing instructions. The instructions, when executed by the processor, cause the electronic device obtain an image via the camera, identify at least one area in the image by performing segmentation on the image, the at least one area respectively corresponding to at least one object included in the image, obtain a brightness of the at least one area, identify at least one weight respectively corresponding
(Continued)

to the at least one object, and control an exposure of the camera based on the brightness of the at least one area and the at least one weight.

16 Claims, 15 Drawing Sheets

(51) Int. Cl.
*H04N 23/611* (2023.01)
*H04N 23/71* (2023.01)

(58) Field of Classification Search
CPC ........ H04N 23/60; H04N 23/611; H04N 5/77; G06T 7/10; G06T 7/11; G06T 7/20; G06V 40/10
See application file for complete search history.

(56) References Cited

U.S. PATENT DOCUMENTS

| | | | |
|---|---|---|---|
| 2005/0271379 | A1 | 12/2005 | Lee |
| 2007/0177050 | A1 | 8/2007 | Xiao et al. |
| 2011/0249961 | A1 | 10/2011 | Brunner |
| 2012/0105675 | A1 | 5/2012 | Quan et al. |
| 2013/0002941 | A1 | 1/2013 | Park et al. |
| 2013/0193309 | A1 | 8/2013 | Nakata et al. |
| 2015/0325023 | A1 | 11/2015 | Gross |
| 2015/0379740 | A1 | 12/2015 | Yang et al. |
| 2017/0070666 | A1 | 3/2017 | Kim |
| 2017/0324909 | A1 | 11/2017 | Choi et al. |
| 2018/0167545 | A1 | 6/2018 | Kosaka |
| 2018/0288311 | A1 | 10/2018 | Baghert et al. |
| 2019/0012776 | A1 | 1/2019 | Liu |
| 2020/0195857 | A1 | 6/2020 | Sekine |
| 2021/0360138 | A1 | 11/2021 | Ramsay |

FOREIGN PATENT DOCUMENTS

| | | | | | |
|---|---|---|---|---|---|
| CN | 113473032 | A | * | 10/2021 | ............. H04N 23/71 |
| CN | 113905182 | A | * | 1/2022 | ........... H04N 23/667 |
| EP | 2175635 | A1 | * | 4/2010 | ............. H04N 23/68 |
| JP | H11202378 | A | | 7/1999 | |
| JP | 2017520186 | A | | 7/2017 | |
| JP | 2018098649 | A | | 6/2018 | |
| JP | 2019118115 | A | | 7/2019 | |
| JP | 2020096282 | A | | 6/2020 | |
| KR | 20060003390 | A | | 1/2006 | |
| KR | 101352349 | B1 | | 1/2014 | |
| KR | 20170030347 | A | | 3/2017 | |
| KR | 20170125604 | A | | 11/2017 | |
| KR | 101812807 | B1 | | 12/2017 | |
| KR | 20180086646 | A | | 8/2018 | |
| WO | WO-2021135824 | A1 | * | 7/2021 | ............. H04N 23/71 |
| WO | WO-2021223113 | A1 | * | 11/2021 | ............. H04N 23/60 |

OTHER PUBLICATIONS

Korean Office Action Issued In KR Application No. 10-2022-0016487; Mail Date Nov. 20, 2025; 9 Pages.

* cited by examiner

METHOD FOR PROVIDING IMAGE, AND ELECTRONIC DEVICE FOR SUPPORTING SAME

CROSS-REFERENCE TO RELATED APPLICATIONS

This application is a continuation of International Application No. PCT/KR2023/000169, designating the United States, filed on Jan. 4, 2023, in the Intellectual Property Receiving Office and claiming priority to Korean Patent Application No. 10-2022-0012537 and Korean Patent Application No. 10-2022-0016487, which were filed in the Korean Patent Office on Jan. 27, 2022 and Feb. 8, 2022, respectively, the entire disclosure of each of which is incorporated herein by reference.

TECHNICAL FIELD

Various embodiments of the disclosure relate to a method of providing an image, and an electronic device for supporting the same.

BACKGROUND ART

An electronic device such as a smartphone may control a setting of a camera module in order to obtain an image that a user desires. For example, the electronic device may control the exposure of the camera module in order to obtain an image having appropriate brightness.

In the case in which an image is obtained via the camera module, the electronic device may calculate the average brightness of the entire area of the obtained image or the brightness of a central area of the obtained image, as an operation for controlling the exposure of the camera module. The electronic device may control the exposure of the camera module based on the calculated average brightness of the entire area of the image or the calculated brightness of the central area of the image.

DETAILED DESCRIPTION OF THE INVENTION

Technical Problem

In the case in which an electronic device controls the exposure of a camera module based on the average brightness of the entire area of an image, the exposure of the camera may be set based on the brightness of the entire area of the image irrespective of the type of a subject of photographing.

In addition, in the case in which the electronic device controls the exposure of a camera module based on the average brightness of a central area of an image and a subject (e.g., a person) is located in an edge of a field of view of the camera, the exposure of the camera may be set based on the brightness of an area corresponding to a background as opposed to the brightness of an area corresponding to a subject in an image obtained via the camera.

Various embodiments of the disclosure relate to a method of providing an image and an electronic device for supporting the same, and the method and apparatus control the exposure of a camera based on a subject (e.g., a person), irrespective of a location of the subject in a field of view of the camera, by controlling the exposure of the camera based on at least one object obtained (e.g., classified) via segmentation of an image.

The technical subject matter of the disclosure is not limited to the above-mentioned technical subject matters, and other technical subject matters which are not mentioned may be understood by those skilled in the art based on the following description.

Technical Solution

An electronic device according to various embodiments of the disclosure may include a camera, a processor, and memory storing instructions. The instructions, when executed by the processor, cause the electronic device obtain an image via the camera, identify at least one area in the image by performing segmentation on the image, the at least one area respectively corresponding to at least one object included in the image, obtain a brightness of the at least one area, identify at least one weight respectively corresponding to the at least one object, and control an exposure of the camera based on the brightness of the at least one area and the at least one weight.

A method of providing an image by an electronic device according to various embodiments of the disclosure may include obtaining an image via a camera of the electronic device, identifying at least one area in the image by performing segmentation on the image, the at least one area respectively corresponding to at least one object included in the image, obtaining a brightness of the at least one area, identifying at least one weight respectively corresponding to the at least one object, and controlling an exposure of the camera based on the brightness of the at least one area and the at least one weight.

Advantageous Effects

A method of providing an image and an electronic device for supporting the same according to various embodiments of the disclosure may control the exposure of a camera based on a subject (e.g., a person), irrespective of the location of a subject in a field of view of the camera, by controlling the exposure of the camera based on at least one object obtained (e.g., classified) via segmentation of an image.

MODE FOR CARRYING OUT THE INVENTION

Figure 1:
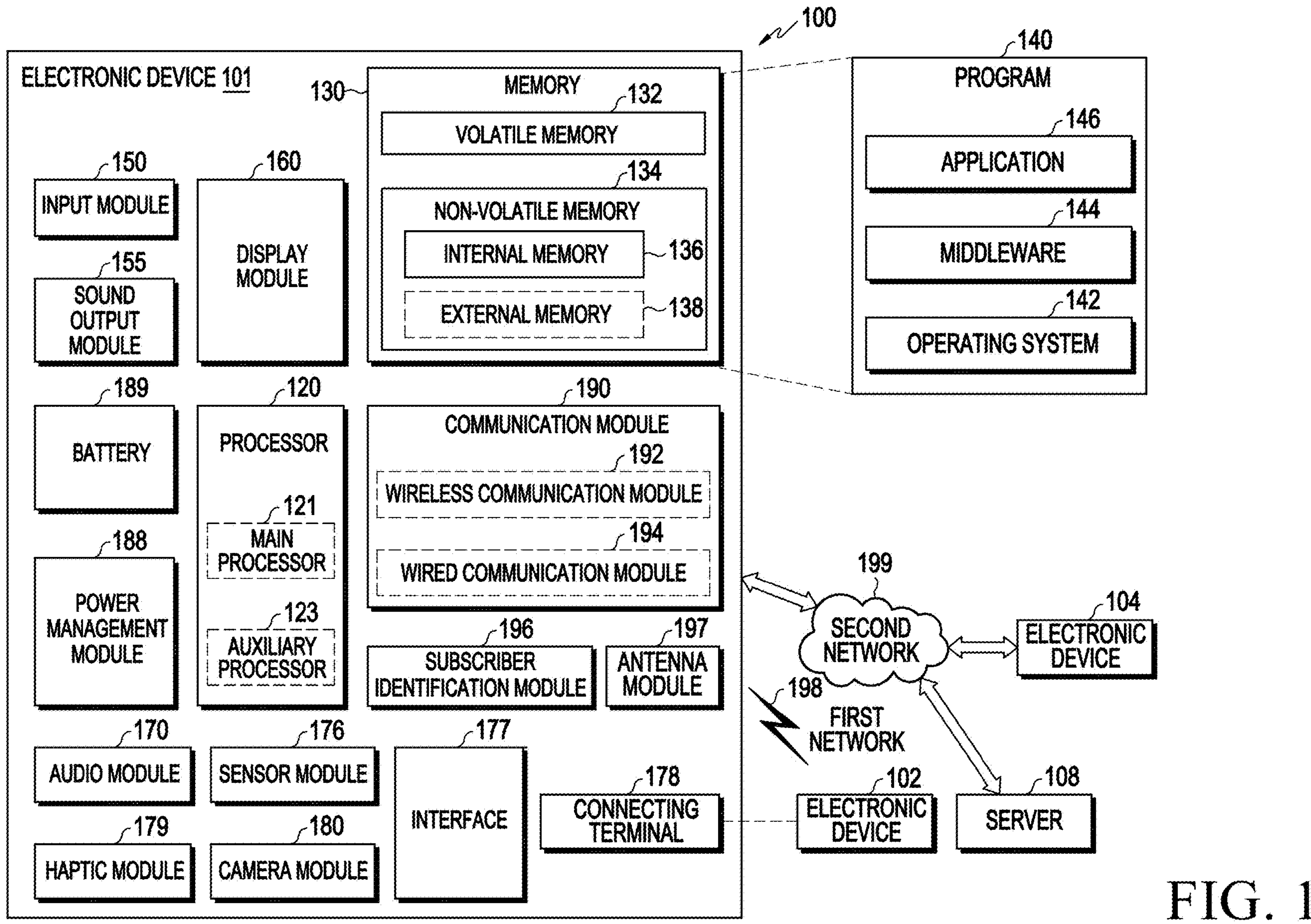
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit, board, or adjacent to the first surface and capable of supporting a designated high-frequency band (e.g., the mmWave.band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween.via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network.

According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer.

The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
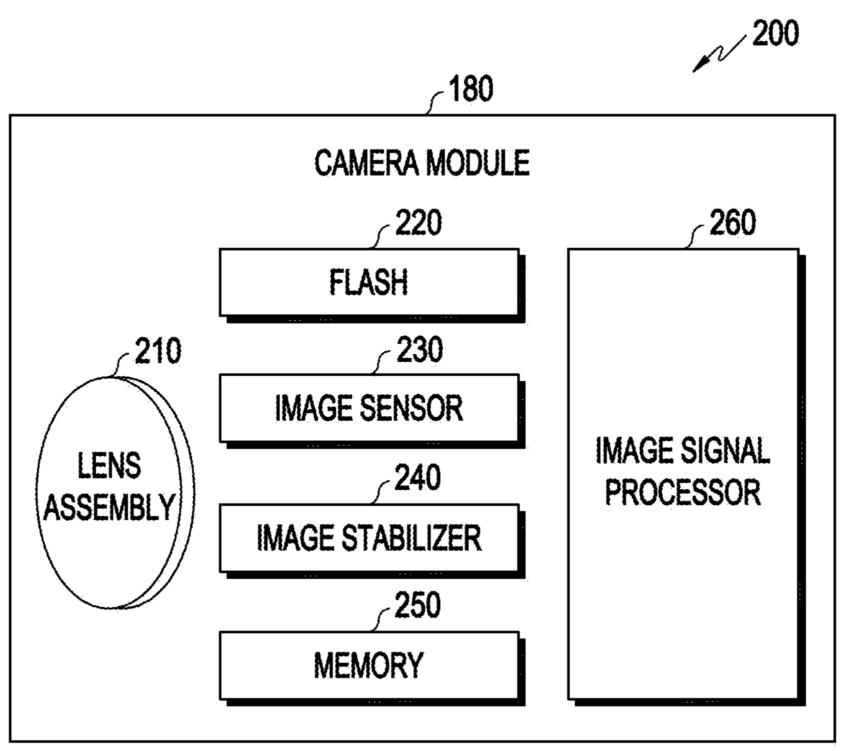
FIG. 2 is a block diagram illustrating a camera module according to various embodiments.

FIG. 2 is a block diagram 200 illustrating the camera module 180 according to an embodiment.

Referring to FIG. 2, the camera module 180 may include a lens assembly 210, a flash 220, an image sensor 230, an image stabilizer 240, a memory 250 (e.g., buffer memory), or an image signal processor 260.

The lens assembly 210 may collect light emitted or reflected from an object whose image is to be taken. The lens assembly 210 may include one or more lenses.

According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object.

According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal.

According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
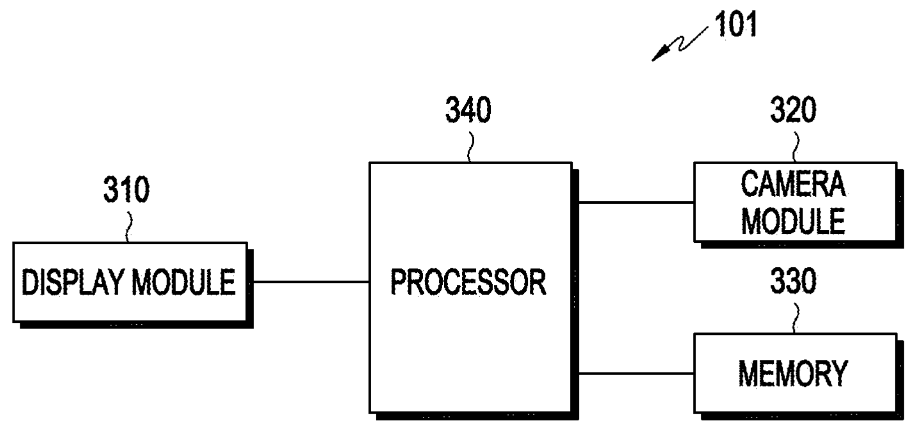
FIG. 3 is a block diagram illustrating an electronic device according to various embodiments.

FIG. 3 is a block diagram illustrating the electronic device 101 according to various embodiments.

Referring to FIG. 3, the electronic device 101 according to an embodiment may include a display module 310, a camera module 320, memory 330, and/or a processor 340.

According to an embodiment, the display module 310 may include the display module 160 of FIG. 1.

According to an embodiment, the display module 310 (hereinafter, also referred to as "display") may display various screens. For example, the display module 310 may display an image obtained via the camera module 320. The image that the display module 310 displays may include a static image such as a captured image that is obtained based on a user input while a video, such as a preview image, and/or a preview image is displayed.

According to an embodiment, the camera module 320 may be included in the camera module 180 of FIG. 1 and FIG. 2.

According to an embodiment, the camera module 320 (hereinafter, also referred to as "camera") may obtain an image based on a camera setting set by the processor 340. For example, the camera module 320 may consecutively (or sequentially) obtain a plurality of frames based on a camera setting (e.g., a shutter speed, sensitivity of an image sensor (also referred to as international standard organization (ISO) sensitivity), and/or an aperture value) that relates to the exposure and is set by the processor 340.

According to an embodiment, the memory 330 may be included in the memory 130 of FIG. 1.

According to an embodiment, the memory 330 may store information for performing at least part of an operation of providing an image. The information that the memory 330 stores and that is for performing at least part of an operation of providing an image will be described in detail later.

According to an embodiment, the processor 340 may be included in the processor 120 of FIG. 1.

According to an embodiment, the processor 340 may control an overall operation of providing an image. According to an embodiment, the processor 340 may include one or more processors for performing an operation of providing an image.

Components that the processor 340 includes in order to perform an operation of providing an image will be described in detail with reference to FIG. 4.

According to an embodiment, the electronic device 101 in FIG. 3 may include the display module 310, the camera module 320, the memory 330, and/or the processor 340, but the disclosure is not limited thereto. For example, the electronic device 101 may further include the communication module 190 of FIG. 1 in order to share an image obtained via the camera module 320 with an external electronic device (e.g., the electronic device 102, the electronic device 104, and/or the server 108).

Figure 4:
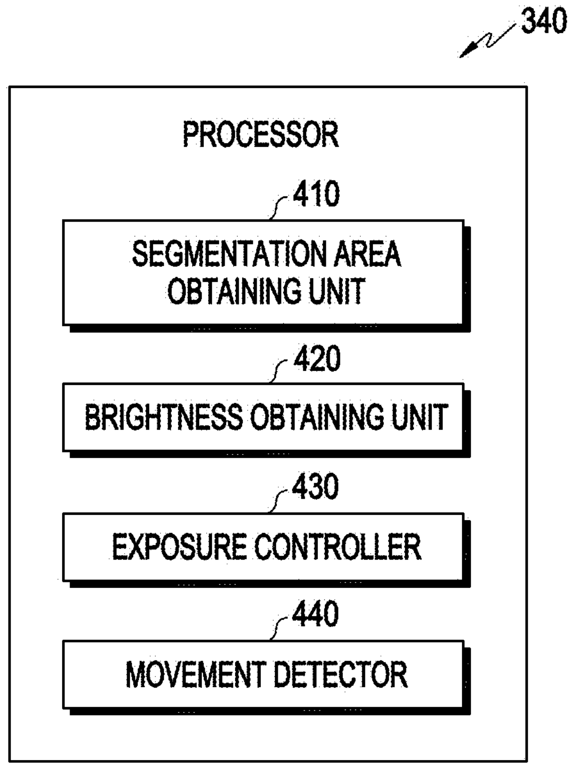
FIG. 4 is a block diagram illustrating a processor according to various embodiments.

FIG. 4 is a block diagram illustrating the processor 340 according to various embodiments.

With reference to FIG. 3 and additionally referring to FIG. 4, according to an embodiment, the processor 340 may include a segmentation area obtaining unit 410, a brightness obtaining unit 420, an exposure controller 430, and/or a movement detector 440.

According to an embodiment, the segmentation area obtaining unit 410 may perform a segmentation operation with respect to an image obtained via the camera module 320, so as to identify at least one area respectively corresponding to at least one object (an "object" is referred to as a "class") (hereinafter, also referred to as "at least one object") included in the image (hereinafter, at least one area respectively corresponding to at least one object is referred to as "at least one first area").

According to an embodiment, the segmentation area obtaining unit 410 may perform a segmentation operation with respect to an image obtained via the camera module 320. For example, the segmentation area obtaining unit 410 may perform segmentation on an image by using a designated algorithm and/or artificial intelligence model. According to an embodiment, an artificial intelligence model for performing segmentation of an image may include a panoptic segmentation network. However, the artificial intelligence model for performing segmentation of an image is not limited thereto, but may include an instance segmentation network, an FCN, U-Net, DeepLab V3+, or Atrous convolution.

According to an embodiment, the segmentation area obtaining unit 410 may perform segmentation on an image to classify at least one object included in the image, and may obtain information associated with a location of the at least one classified object. For example, the segmentation area obtaining unit 410 may classify at least one object included in the image by performing segmentation on an image, and may obtain information associated with coordinates of at least one first area, at which at least one object is displayed, for each of the at least one classified object in the image.

According to an embodiment, the brightness obtaining unit 420 may obtain the brightness of at least one first area. For example, the brightness obtaining unit 420 may obtain a brightness value (e.g., a Y value in YCbCr color space) (hereinafter, the brightness value is also referred to as a "Y value") for each of at least one first area.

According to an embodiment, the brightness obtaining unit 420 may obtain the brightness of an image in consideration of at least one weight corresponding to each of at least one object. For example, the brightness obtaining unit 420 may identify at least one weight that is stored in the memory 330 and that is set for each of at least one object corresponding to at least one first area. The brightness obtaining unit 420 may obtain the brightness of the image (e.g., the brightness of an entire image) by calculating a weighted average of the brightness of at least one first area based on the brightness of the at least one first area and at least one weight.

According to an embodiment, the exposure controller 430 may control the exposure of the camera module 320 based on the brightness of an image. For example, the exposure controller 430 may control the exposure of the camera module 320 based on the brightness of an image and a designated brightness (hereinafter, referred to as a "target brightness"). According to an embodiment, the target brightness is brightness that an image, to be obtained by the camera module 320, aims to have by adjusting a setting (e.g., a setting related to the exposure) of the camera module 320 based on an image obtained via the camera module 320. For example, in the case in which the setting (e.g., the setting related to the exposure) of the camera module 320 is gradually adjusted based on an image obtained via the camera module 320, the target brightness may be a designated brightness that an image to be obtained via the camera module 320 needs to finally have. The target brightness may be designated by the processor 340. According to an embodiment, the target brightness may be set to be a fixed brightness value, or may be changed based on an environment (e.g., ambient luminance) around the electronic device 101.

According to an embodiment, the exposure controller 430 may obtain an exposure value (EV) based on the brightness of an image (e.g., the brightness of an entire image) and a target brightness. Based on the exposure value, the exposure controller 430 may set a shutter speed, ISO sensitivity, and/or an aperture value related to the exposure of the camera module 320.

According to an embodiment, the movement detector 440 may detect a movement of at least one object in an image obtained via the camera module 320. The movement detector 440 may set (e.g., adjust) a setting (e.g., a shutter speed and ISO sensitivity) related to the exposure of the camera module 320 based on a degree of movement of at least one object in the image.

FIG. 4 illustrates that the processor 340 includes the segmentation area obtaining unit 410, the brightness obtaining unit 420, the movement detector 440, and/or the exposure controller 430, but the disclosure is not limited thereto. For example, although not illustrated in FIG. 4, the processor 340 may further include at least one component for performing various processes in order to process (or correct) the brightness of an image, such as high dynamic range (HDR) processing with respect to an image obtained via the camera module 320.

The electronic device 101 according to various embodiments of the disclosure may include the camera module 320, a processor 340, and the memory 330. The instructions may, when executed by the processor 340, cause the electronic device 101 to obtain an image via the camera module 320, identify at least one area in the image by performing segmentation on the image, the at least one area respectively corresponding to at least one object included in the image, obtain a brightness of the at least one area, identify at least one weight respectively corresponding to the at least one object, and control an exposure of the camera module 320 based on the brightness of the at least one area and the at least one weight.

In various embodiments, the instructions may, when executed by the processor 340, cause the electronic device 101 to detect the at least one object included in the image by performing the segmentation on the image and obtain information associated with a location of the at least one detected object.

In various embodiments, the instructions may, when executed by the processor 340, further cause the electronic device 101 to set a plurality of weights for a plurality of objects, respectively, so that at least portions of the plurality of objects have different weights, and to store the plurality of objects and the plurality of weights in the memory 330.

In various embodiments, the instructions may, when executed by the processor 340, further cause the electronic device 101 to set a weight for a person object, the weight for the person object being higher than a weight for another object among the plurality of objects.

In various embodiments, the instructions may, when executed by the processor 340, further cause the electronic device 101 to set the highest weight for a person object corresponding to a user of the electronic device 101 among a plurality of person objects.

In various embodiments, the instructions may, when executed by the processor 340, further cause the electronic device 101 to obtain the brightness of the image based on the brightness of the at least one area and the at least one weight, to determine an exposure value of the camera module 320 based on the brightness of the image and a target brightness and to control the exposure of the camera module 320 based on the exposure value of the camera module 320.

In various embodiments, the instructions may, when executed by the processor 340, further cause the electronic device 101 to identify whether the at least one object includes a designated object, based on the at least one object including the designated object, determine to control the exposure of the camera module 320 based on an object in the image, and based on the at least one object not including the designated object, determine to control the exposure of the camera module 320 based on a central area.

In various embodiments, the instructions may, when executed by the processor 340, further cause the electronic device 101 to detect a change amount of a location of the at least one area, and the instructions may, when executed by the processor 340, further cause the electronic device 101 to set a shutter speed of the camera module 320 based on the change amount of the location of the at least one area.

In various embodiments, the instructions may, when executed by the processor 340, further cause the electronic device 101 to identify whether the at least one object includes a designated object and the instructions may, when executed by the processor 340, further cause the electronic device 101 to based on the at least one object including the designated object, control the exposure of the camera module 320 based on a first convergence speed and based on the at least one object not including the designated object, control the exposure of the camera module 320 based on a second convergence speed higher than the first convergence speed.

In various embodiments, the instructions may, when executed by the processor 340, further cause the electronic device 101 to identify whether a change of the brightness of the at least one area is less than a change of the brightness caused by a movement of the at least one object, and the instructions may, when executed by the processor 340, further cause the electronic device 101 to based on the change of the brightness of the at least one area being less than or equal to the change of the brightness caused by the movement of the at least one object, control the exposure of the camera module 320 based on a first convergence speed, and based on the change of the brightness of the at least one area being greater than the change of the brightness caused by the movement of the at least one object, control the exposure of the camera module 320 based on a second convergence speed higher than the first convergence speed.

Figure 5:
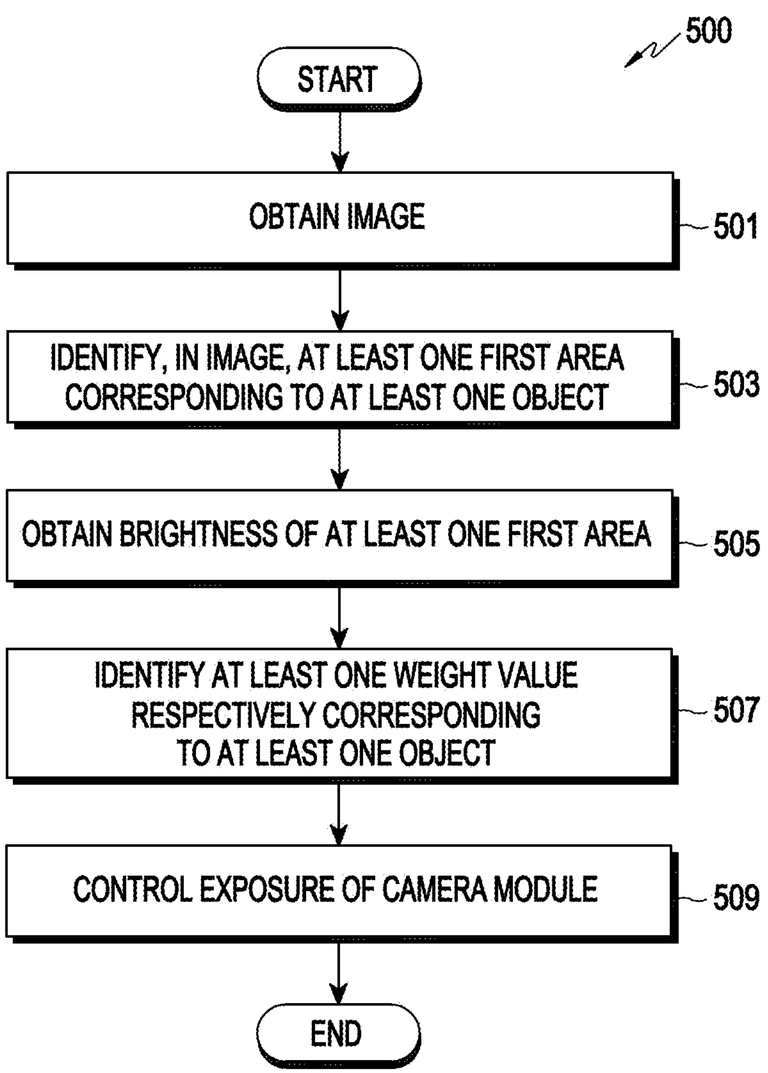
FIG. 5 is a flowchart illustrating a method of providing an image according to various embodiments.

FIG. 5 is a flowchart 500 illustrating a method of providing an image according to various embodiments.

As shown in FIG. 5, in operation 501, according to an embodiment, the processor 340 may obtain an image via the camera module 320.

According to an embodiment, the processor 340 may obtain the image via the camera module 320 while a camera application is executed. For example, in response to execution of a camera application, the processor 340 may consecutively obtain a plurality of frames via the camera module 320 in order to display a preview image via the display module 210. As another example, the processor 340 may obtain a plurality of frames based on a user input for capturing an image.

According to an embodiment, the processor 340 may perform an operation (e.g., operations 503 to 509) of controlling the exposure of the camera module 320 with respect to each of a plurality of frames that are consecutively obtained via the camera module 320. For example, in the case in which the camera module 320 obtains a plurality of frames at 30 frame per second (FPS), the processor 340 may perform an operation of controlling the exposure of the camera module 320 every 1/30 seconds. In this instance, the disclosure is not limited thereto, and in the case in which an FPS at which the camera module 320 obtains a plurality of frames is greater than or equal to a designated FPS (e.g., 120 FPS), the camera module 320 may perform an operation of controlling the exposure of the camera module 320 every two frames (or three or more frames).

In operation 503, according to an embodiment, the processor 340 may perform segmentation of the image obtained via the camera module 320, and may identify, from the image, at least one first area respectively corresponding to at least one object included in the image.

According to an embodiment, the processor 340 may perform segmentation with respect to the image obtained via the camera module 320. For example, the processor 340 may perform segmentation of the image by using a designated algorithm and/or an artificial intelligence model. According to an embodiment, an artificial intelligence model for performing segmentation of an image may include a panoptic segmentation network. However, the artificial intelligence model for performing segmentation of an image is not limited thereto, but may include an instance segmentation network, an FCN, U-Net, DeepLab V3+, or Atrous convolution.

According to an embodiment, the processor 340 may classify at least one object included in the image by performing segmentation on an image, and may obtain information associated with a location of the at least one classified object. Hereinafter, with reference to FIG. 6, segmentation that the processor 340 performs with respect to an image will be described.

Figure 6:
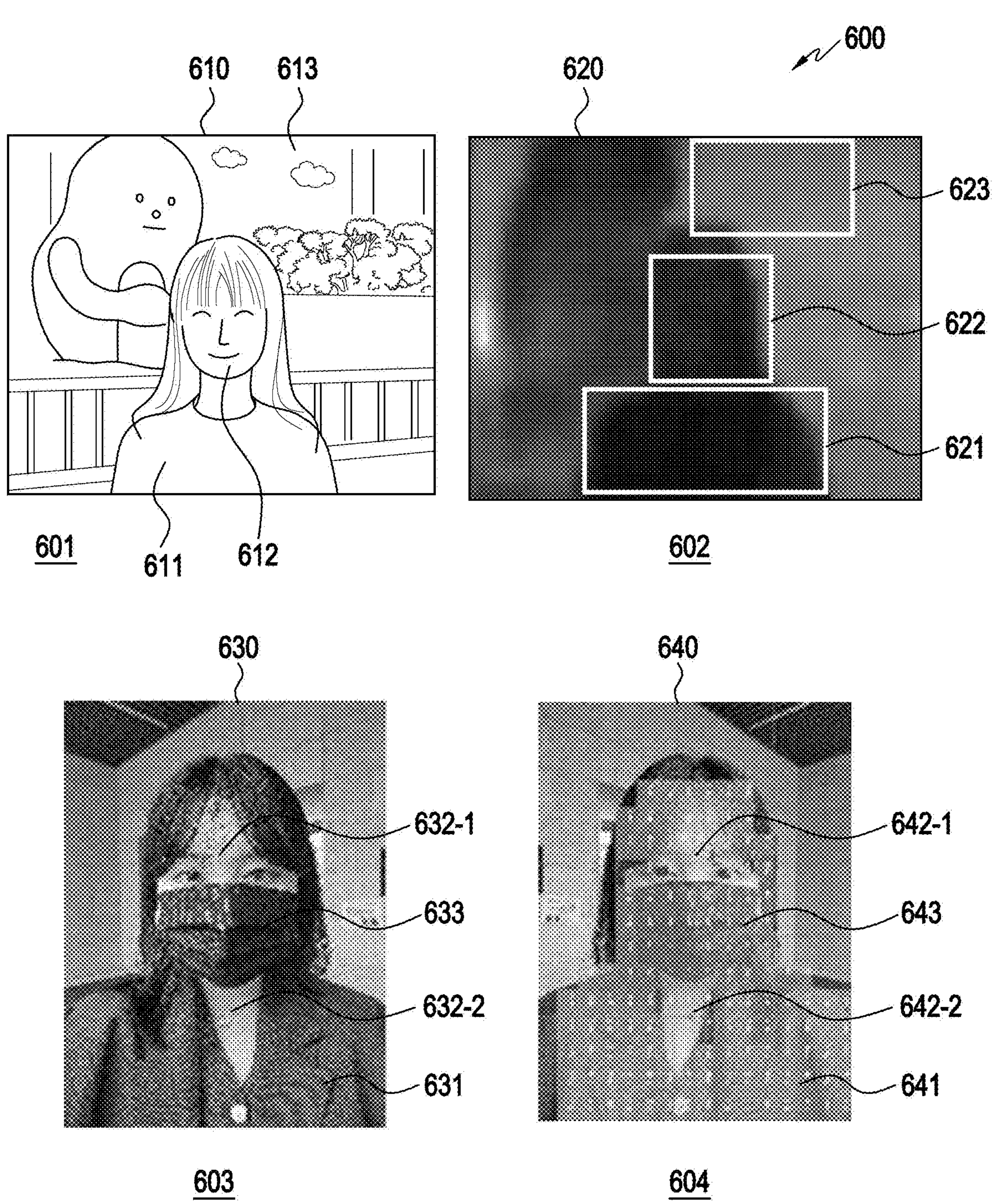
FIG. 6 is a diagram illustrating segmentation according to various embodiments.

FIG. 6 is a diagram 600 illustrating segmentation according to various embodiments.

Referring to FIG. 6, diagram 601 of FIG. 6 may show an image 610 obtained via the camera module 320. For ease of description, FIG. 6 assumes that the image 610 includes a body object 611 of a person, a skin object 612 of the person, and a sky object 613.

According to an embodiment, the processor 340 may perform segmentation of the image 610, so as to detect (e.g., classify), from one or more of the image 610, the body object 611, the skin object 612, and the skin object 613 as the at least one object included in the image 610.

According to an embodiment, in diagram 602 of FIG. 6, an image map 620 may include a location (and brightness) of each of at least one object that corresponds to the image 610 and is included in the image 610. The processor 340 may perform segmentation of the image 610 and may identify, from the image 610, a body area 621, a skin area 622, and a sky area 623 as a plurality of first areas respectively corresponding to the body object 611, the skin object 612, and the sky object 613. For example, the processor 340 may obtain locations of the body area 621, the skin area 622, and the sky area 623 respectively corresponding to the body object 611, the skin object 612, and the sky object 613 in the image 610. Although it is illustrated that the body area 621, the skin area 622, and the sky area 623 are in rectangular shapes in diagram 602, the disclosure is not limited thereto. For example, at least one first area respectively corresponding to at least one object may be an area formed by the contour (or boundary) (enclosed by the contour) of the at least one object in an image. For example, reference numeral 603 of FIG. 6 may indicate an image 630 obtained through the camera module 320. The image 630 may include a body object 631, a skin object (e.g., objects 631-1 and 631-2), and a mask object 633. The processor may identify, as shown in reference numeral 604 of FIG. 6, a body object 631, a skin object (e.g., objects 631-1 and 631-2), a body area 641 corresponding to each of the mask object 633, a skin area (e.g., regions 642-1 and 642-2), and a mask area 643 by performing segmentation on the image 630. In an embodiment, the body area 641 may be an area other than a body area 641 and a skin area (e.g., regions 642-1 and 642-2) in a person area corresponding to a person object.

According to an embodiment, in the case in which an image is configured with a plurality of patches (e.g., an image is classified as a plurality of patches), a first area may include, among the plurality of patches, a plurality of patches including an object that corresponds to the first area.

According to an embodiment, in the case in which the processor 340 performs segmentation of an image, and obtains information associated with a location of at least one object included in the image, the processor 340 may store information associated with the location of the at least one object in the memory 330.

In operation 505, according to an embodiment, the processor 340 may obtain the brightness of the at least one first area.

According to an embodiment, the processor 340 may obtain the brightness of each of the at least one first area. For example, the processor 340 may obtain brightness (e.g., a brightness value) for each of the at least one first area.

Hereinafter, a method of obtaining the brightness of at least one first area corresponding to at least one object will be described with reference to FIG. 7.

Figure 7:
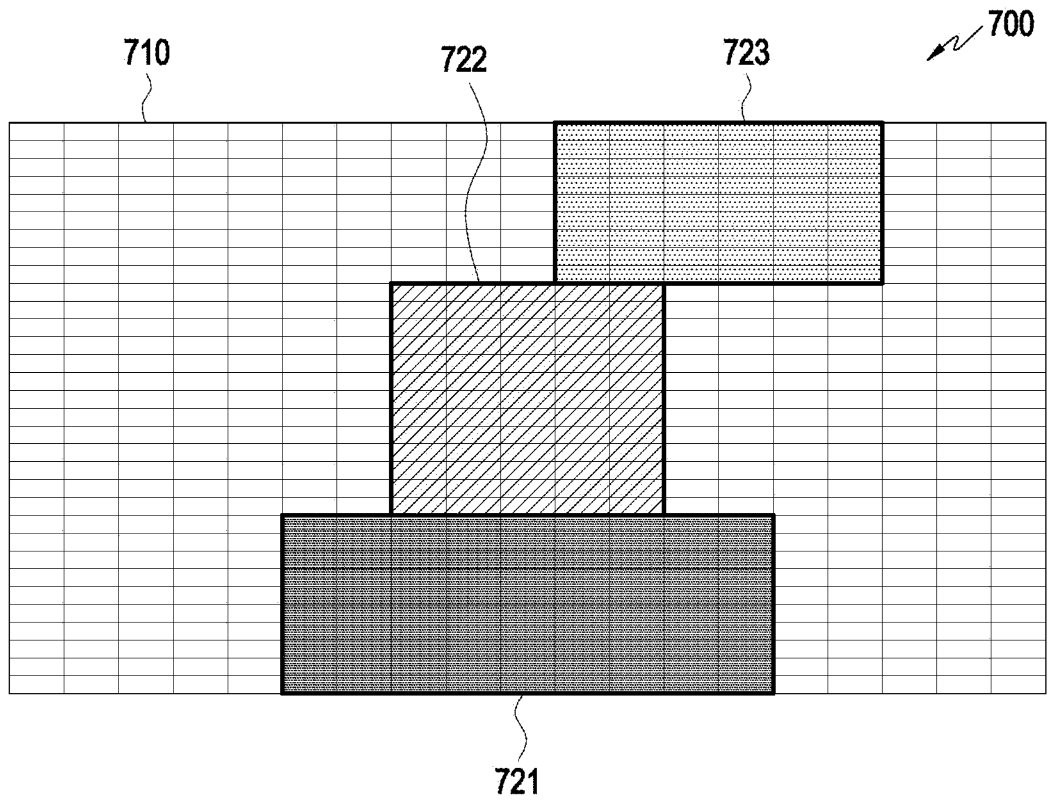
FIG. 7 is a diagram illustrating a method of obtaining brightness of a first area corresponding to an object according to various embodiments.

FIG. 7 is a diagram 700 illustrating a method of obtaining brightness of a first area corresponding to an object according to various embodiments.

Referring to FIG. 7, according to an embodiment, an image map 710 may be set with (e.g., classified as) a plurality of patches. For example, the image map 710 may be classified as 19 patches in width and 32 patches in height as illustrated in FIG. 7. According to an embodiment, in the image map 710 of FIG. 7, a plurality of first patches 721 is the body area 621 of FIG. 6, a plurality of second patches 722 is the skin area 622 of FIG. 6, and a plurality of third patches 723 is the sky area 623 of FIG. 6.

According to an embodiment, the processor 340 may obtain the brightness of each of the plurality of patches included in at least one first area. According to an embodiment, from each of the plurality of patches included in the at least one first area, the processor 340 may calculate a brightness value based on pixel values of each of the plurality of patches by using Equation 1 below.

$$\text{Brightness } (Y) = 0.299 * R + 0.587 * G + 0.114 * B \qquad \text{[Equation 1]}$$

According to an embodiment, in Equation 1, R denotes a red value of pixels included in a patch expressed as RGB data, G denotes a green value of pixels included in a patch expressed as RGB data, and B denotes a blue value of pixels included in a patch expressed as RGB data. In Equation 1, coefficients (0.299, 0.587, 0144) may be changed depending on R/G and/or B/G of an image calculated via the camera module 320.

According to an embodiment, the processor 340 may obtain the average brightness of the plurality of patches included in the at least one first area as the brightness of the at least one first area. For example, in each of the plurality of first patches of the body area 621, the processor 340 may calculate a brightness value (e.g., a Y value in YCbCr color space) based on the pixel values (e.g., RGB data) of each of the plurality of first patches 721. The processor 340 may obtain the average of brightness values of the plurality of first patches 721 of the body area 621 as the brightness of the body area 621.

Although FIG. 7 illustrates a method of obtaining the location and brightness of at least one first area by using a plurality of patches, the disclosure is not limited thereto. For example, the processor 340 may obtain the location and brightness of at least one first area by using coordinates and brightness values of pixels included in each of the at least one first area, as opposed to using the plurality of patches.

Although FIG. 6, FIG. 7, and the above-described examples illustrate obtaining the brightness of the at least one first area corresponding to at least one object (e.g., the plurality of first patches 721 corresponding to the body area 621, the plurality of second patches 722 corresponding to the skin area 622, and the plurality of third patches 723 corresponding to the sky area 623) in an image (e.g., the image map 710), the disclosure is not limited thereto. For example, the processor 340 may obtain the brightness of the remaining areas excluding the at least one first area (e.g., the patches remaining after excluding the plurality of first patches 721, the plurality of second patches 722, and the plurality of third patches 723 in the image map 710) from the image (e.g., the image map 710), together with the brightness of the at least one first area corresponding to the at least one object.

With reference to FIG. 5 again, in operation 507, according to an embodiment, the processor 340 may identify at least one weight respectively corresponding to at least one object.

According to an embodiment, the processor 340 may set (e.g., assign) a plurality of weights respectively corresponding to a plurality of objects. For example, the processor 340 may set a plurality of weights respectively corresponding to a plurality of objects, as shown in Table 1 below.

TABLE 1

| object | Skin object | Body object | Background | Mask object |
|---|---|---|---|---|
| Weight | level 4 | level 3 | level 2 | level 1 |

According to an embodiment, Table 1 includes a skin object, a body object, and a mask object, as an object. The background may be a part remaining after excluding at least one object, obtained via segmentation, in an image obtained via the camera module 320. In Table 1, a high weight corresponds (is mapped) to a level in order of level 4, level 3, level 2, and level 1 (e.g., the highest weight corresponds to level 4 and the lowest weight corresponds to level 1 in Table 1). In Table 1, a mask object may be an object associated with a mask used for the purpose of covering the mouth (and nose) of a person. According to an embodiment, the processor 340 may set a higher weight for a person object and/or an object (e.g., a skin object, a body object) included in a person than weights for other objects, and may set the lowest weight or may set substantially "0" for a mask object, so that the brightness of an image is not affected by the brightness of a mask worn by a person.

According to an embodiment, the processor 340 may set different weights for at least some of a plurality of objects.

According to an embodiment, the processor 340 may map a plurality of objects and weights respectively set for the plurality of objects, and may store the same in the memory 330. For example, the processor 340 may store, in the memory 330, a table listing a plurality of objects mapped to weights which are respectively set for the plurality of objects. According to an embodiment, the processor 340 may identify at least one weight that respectively corresponds to at least one object detected in an image, via the table stored in the memory 330.

According to an embodiment, the processor 340 may set a higher weight for an object related to a person (e.g., a person object, a skin object included in a person object, a body object included in a person object) than other objects (e.g., a thing object).

According to an embodiment, the processor 340 may set different weights for at least some of a plurality of person objects. For example, the processor 340 may set a higher weight for a person object corresponding to a user of the electronic device 101 than other person objects corresponding to other persons (e.g., other persons registered with contact information of the electronic device 101).

According to an embodiment, the processor 340 may set a lower weight for an object related to a thing worn by a person (e.g., accessories) than other objects (e.g., a background). For example, the processor 340 may set a lower weight for a mask, a necklace, and/or garments than other objects.

According to an embodiment, the processor 340 may store, in the memory 330, a plurality of weights set to respectively correspond to a plurality of objects. According to an embodiment, in the case in which at least one object included in an image is identified by performing segmentation, the processor 340 may identify, from the memory 330, at least one weight respectively corresponding to the at least one object.

Although FIG. 5 illustrates that operation 505 of obtaining the brightness of the at least one first area is performed earlier than operation 507 of identifying the at least one weight respectively corresponding to the at least one object, the disclosure is not limited thereto. For example, it is possible that operation 507 is performed earlier than or at the same time of (or in parallel with) operation 505.

In operation 509, according to an embodiment, the processor 340 may control the exposure of the camera module 320 based on the brightness of the at least one first area and the at least one weight which respectively corresponds to the at least one object.

Operation 509 will be described in detail with reference to FIG. 8 and FIG. 9.

Figure 8:
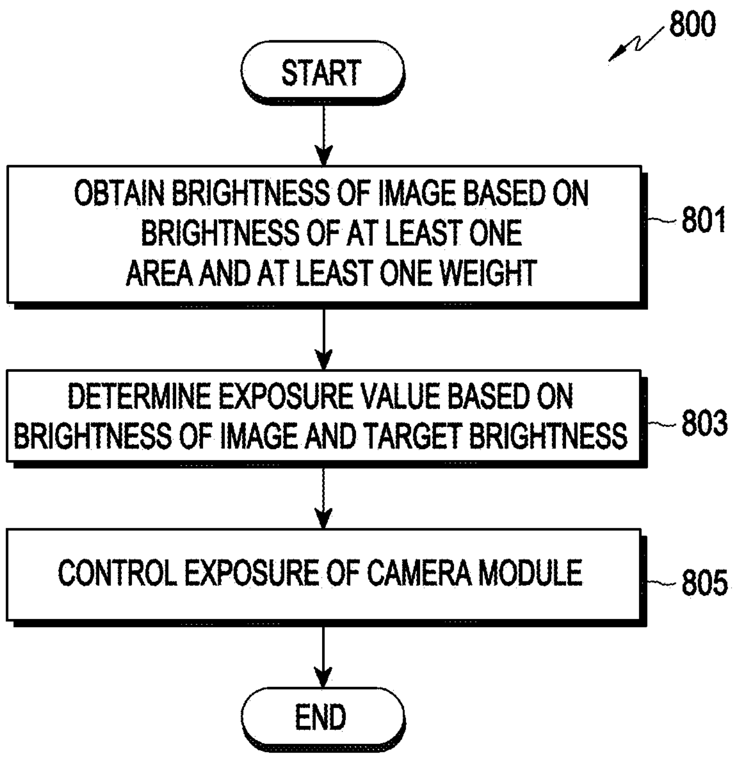
FIG. 8 is a flowchart illustrating a method of controlling the exposure of a camera module according to various embodiments.

FIG. 8 is a flowchart 800 illustrating a method of controlling the exposure of the camera module 320 according to various embodiments.

Referring to FIG. 8, in operation 801, according to an embodiment, the processor 340 may obtain brightness of an image (e.g., the brightness of the entire area of an image obtained via the camera module 320) based on brightness of at least one first area and at least one weight which respectively correspond to at least one object.

According to an embodiment, the processor 340 may obtain the brightness of the image by calculating a weighted average of the brightness of the at least one first area. For example, the processor 340 may obtain the brightness of the image by calculating a weighted average of the brightness of the at least one first area by using Equation 2 given below.

$$\text{Bright of image} = \Sigma_1^N (Y_{patch} \times W_{patch}) \div \Sigma_1^N (W_{patch}) \quad \text{[Equation 2]}$$

According to an embodiment, in Equation 2, the brightness of the image is a weighted average Y value (a weighted average brightness value), and N denotes the number of patches included in the image. In Equation 2, Ypatch denotes the Y value of each of a plurality of patches included in the image, and Wpatch denotes the weight of each of the plurality of patches included in the image. In Equation 2, Wpatch denotes a weight set for an object corresponding to a patch. For example, each of a plurality of first patches 721 corresponding to the body object 621 of FIG. 7 (e.g., included in a first area corresponding to the body object 621) may have a weight set for the body object 621. As another example, each of a plurality of second patches 722 corresponding to the skin object 622 of FIG. 7 may have a weight set for the skin object 622. A method of obtaining the brightness of an image by calculating a weighted average of the brightness of the at least one first area may not be limited to the above-described method that uses Equation 2.

In operation 803, according to an embodiment, the processor 340 may determine an exposure value (EV) based on the brightness of the image (e.g., the brightness of the image obtained in operation 801) and a target brightness.

According to an embodiment, the target brightness is brightness that the image, to be obtained by the camera module 320, aims at to have by adjusting a setting (e.g., a setting related to an exposure) of the camera module 320 based on the image obtained via the camera module. For example, in the case in which the setting (e.g., the setting related to the exposure) of the camera module 320 is gradually adjusted based on the image obtained via the camera module 320, the target brightness may be a designated brightness that an image to be obtained via the camera module 320 needs to finally have.

The target brightness may be designated by the processor 340. According to an embodiment, the target brightness may be set to be a fixed brightness value, or may be changed based on an environment (e.g., ambient luminance) around the electronic device 101.

According to an embodiment, the processor 340 may calculate an adjustment value for the exposure based on the brightness of the image (e.g., the brightness of the image obtained in operation 801) and the target brightness. The adjustment value for the exposure may be an exposure value to be added to the current exposure value of the camera module 320 in order to calculate a target exposure value. For example, the processor 340 may calculate an adjustment value for the exposure and a target exposure value by using Equation 3 and Equation 4 below.

$$\text{delta } EV = \log_2(Y \text{ value of image} \div \text{target } Y \text{ value}) \quad \text{[Equation 3]}$$

[Equation 4]

$$\text{target exposure value} = \text{current exposure value of camera module} + \text{delta } EV$$

According to an embodiment, in Equation 3, delta EV denotes an adjustment value for the exposure, the Y value of an image denotes the brightness value of the image obtained in operation 801, and a target Y value denotes a target brightness value.

According to an embodiment, the target exposure value may be a final exposure value to be set by the camera module 320 via an exposure convergence operation. In the case in which the target exposure value is calculated, the processor 340 may set an exposure value of the camera module 320 so that the camera module 320 gradually (or in stages) converges on the target exposure value over time, from the current exposure value of the camera module 320. With reference to Table 2 below, an operation of setting an exposure value of the camera module 320 by the processor 340 is described.

TABLE 2

| Time | t = 1 | t =2 | t = 3 | t = 4 | t = 5 |
|---|---|---|---|---|---|
| Exposure value of camera module | 6 | 6.25 | 6.5 | 6.75 | 7 |
| Target exposure value | — | 7 | 7 | 7 | 7 |
| Exposure adjustment value | — | 0.75 | 0.50 | 0.25 | 0 |

According to an embodiment, in Table 2, the processor 340 may obtain an image via the camera module 320 of which an exposure value is set to be 6 at t=1. Based on the brightness of the obtained image and the target brightness, the processor 340 may calculate an exposure adjustment value of 1 and a target exposure value of 7 by using Equation 3 and Equation 4. The processor 340 may set the exposure value of the camera module 320 to be 6.25 at t=2 (e.g., a time at which a subsequent frame is obtained-after t=1 at which the current frame is obtained) so that the exposure value of the camera module 320 gradually converges on the target exposure value of 7 over time from the current exposure value of the camera module 320 set to be 6, as shown in the exposure values (e.g., 6.25, 6.5, 6.75, and 7) of the camera module 320 at t=2 to t=5 in Table 2. In Table 2, in the case in which t=1 is the point in time at which the current frame is obtained, t=2 may be the time at which a frame subsequent to the current frame is obtained via the camera module 320.

In Table 2, it is illustrated that the exposure value of the camera module 320 converges on the target exposure value of the camera module 320 via 4 stages (e.g., 6.25, 6.5, 6.75, and 7) from the current exposure value (e.g., 6) of the camera module 320, but the disclosure is not limited thereto. For example, the processor 340 may set the exposure value of the camera module 320 (e.g., an exposure value to be applied to obtain a frame subsequent to the current frame) so that the exposure value of the camera module 320 converges the target exposure value of the camera module 320 via four or more stages or four or fewer stages from the current exposure value (e.g., 6) of the camera module 320.

In operation 805, according to an embodiment, the processor 340 may control the exposure of the camera module 320 based on the exposure value of the camera module 320. For example, in the case in which the exposure value of the camera module 320 is calculated, the processor 340 may set (adjust), based on the exposure value of the camera module 320, a setting related to the exposure of the camera module 320. For example, the processor 340 may set a shutter speed, sensitivity (ISO sensitivity) of an image sensor, and/or an aperture value based on the exposure value of the camera module 320. Hereinafter, with reference to FIG. 9, a method of setting, by the processor 340, a setting related to the exposure of the camera module 320 based on an exposure value of the camera module 320 will be described.

Figure 9:
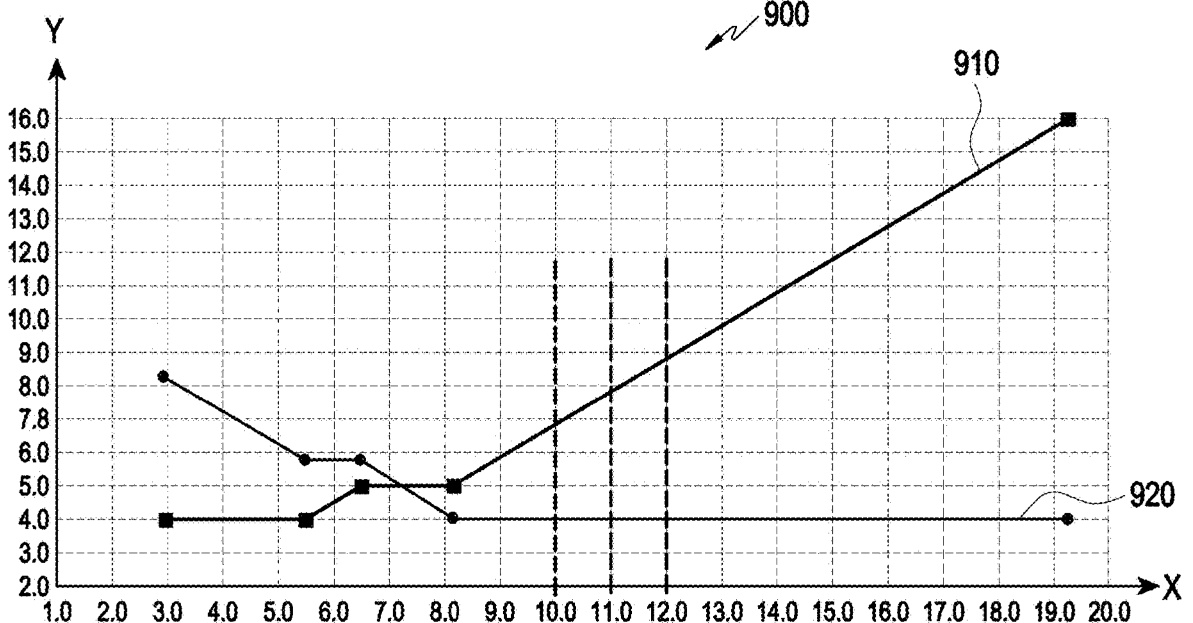
FIG. 9 is a diagram illustrating a method of controlling the exposure of a camera module according to various embodiments.

FIG. 9 is a flowchart 900 illustrating a method of controlling the exposure of the camera module 320 according to various embodiments.

FIG. 9 is a diagram illustrating a graph (e.g., an exposure diagram) that shows a value corresponding to a shutter speed and a value corresponding to sensitivity of an image sensor, which corresponds to an exposure value of the camera module 320.

According to an embodiment, in the graph of FIG. 9, the X-axis denotes an exposure value of the camera module 320 and the Y-axis denotes a value corresponding to a shutter speed (Tv (a value related to an exposure time)) and a value corresponding to sensitivity of an image sensor (Sv (a value related to a speed rating of ISO)).

According to an embodiment, in the graph of FIG. 9, a first line 910 denotes a value (Tv) corresponding to a shutter speed corresponding to an exposure value of the camera module 320, and a second line 920 denotes a value (Sv) corresponding to sensitivity of an image sensor that corresponds to an exposure value of the camera module 320.

According to an embodiment, the processor 340 may calculate a value (Tv) corresponding to a shutter speed and a value (Sv) corresponding to an image sensor by using an exposure value and Equation 5 below.

$$EV_{ISO\,100} = Av + Tv - Sv + 5 \quad \text{[Equation 5]}$$

According to an embodiment, in Equation 5, Av denotes a value corresponding to an aperture value, and Tv denotes a value corresponding to a shutter speed. In Equation 5, $EV_{ISO\ 100}$ denotes an exposure value based on ISO 100 (e.g., in the case of an ISO sensitivity of 100), and a coefficient"5" is a constant value determined based on ISO 100.

According to an embodiment, in the graph of FIG. 9, in the case of the current exposure value of the camera module 320 is 11, Tv is 7.7 and Sv is 4. In the case in which a target exposure value of the camera module 320 is calculated as 10 based on brightness of an image and a target brightness (e.g., in the case in which delta EV is calculated as 1 via Equation 3), the processor 340 may calculate a value (Tv) corresponding to a shutter speed as 6.7 and a value (Sv) corresponding to sensitivity of an image sensor as 4, which correspond to the target exposure value of 10, by using the first line 910 and the second line 920. In the case in which the target exposure value of the camera module 320 is calculated as 12 based on the brightness of the image and the target brightness (e.g., in the case in which delta EV is calculated as −1 via Equation 3), the processor 340 may calculate a value (Tv) corresponding to a shutter speed as 8.7 and a value (Sv) corresponding to sensitivity of an image sensor as 4, which correspond to the target exposure value of 12.

In this instance, the method of calculating a value corresponding to a shutter speed and a value corresponding to sensitivity of an image sensor based on an exposure value of the camera module 320 and Equation 5, described with reference to FIG. 9, is an example, and a value corresponding to a shutter speed and a value corresponding to sensitivity of an image sensor may be calculated based on the exposure value of the camera module 320 by using various methods.

Referring again to FIG. 5, the processor 340 may set a setting related to the exposure of the camera module 320 by controlling the exposure of the camera module 320 via operation 509 and may obtain an image (e.g., a frame subsequent to the current frame) via the camera module 320 based on the setting related to the set exposure.

According to an embodiment, in the case in which the electronic device 101 (e.g., the camera module 320) performs an auto exposure function, the processor 340 may perform at least some of operations 503 to 509 of FIG. 5.

Although not illustrated in FIG. 5, according to an embodiment, the processor 340 may display an obtained image via the display module 210.

Figure 10:
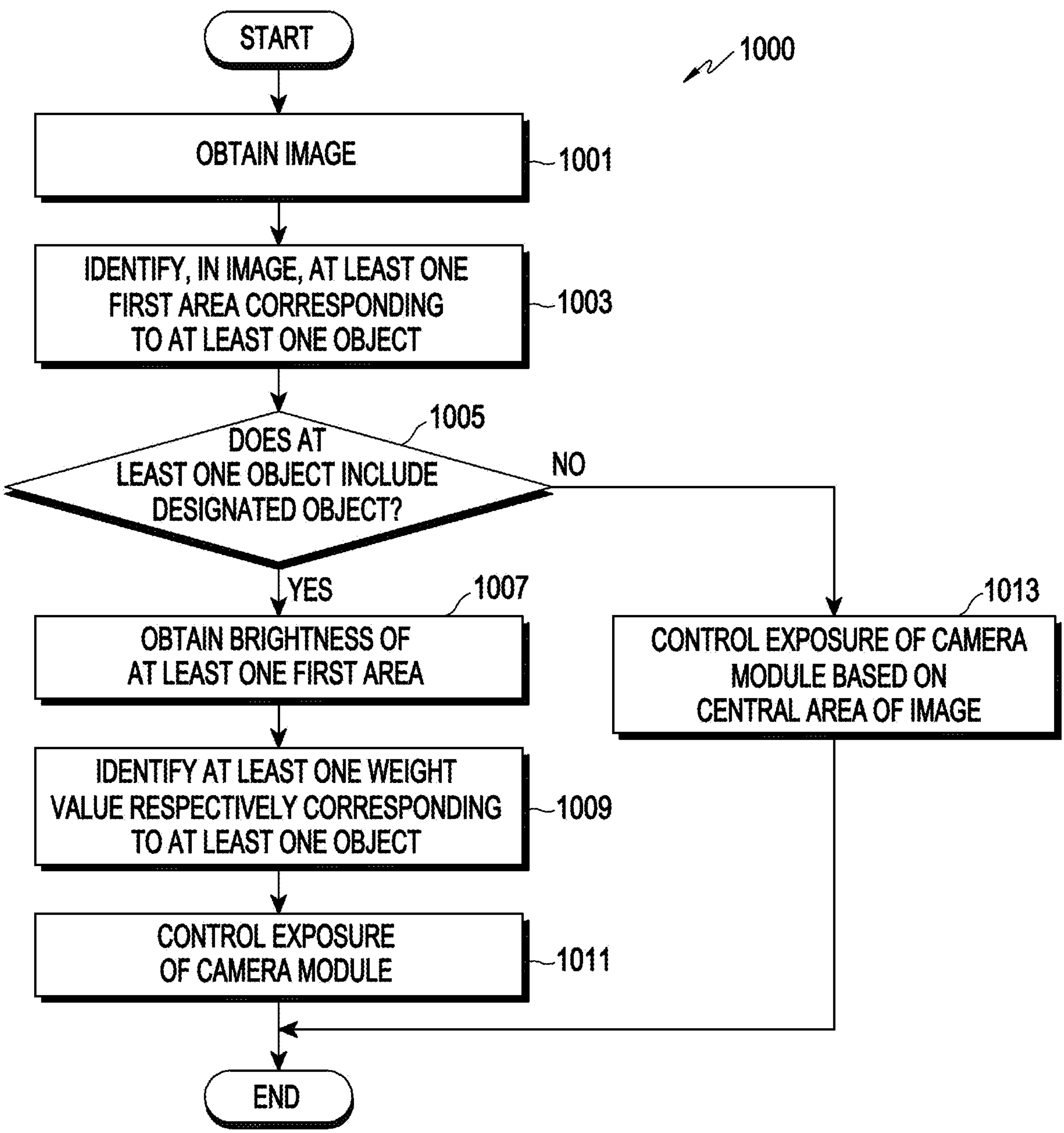
FIG. 10 is a flowchart illustrating a method of providing an image according to various embodiments.

FIG. 10 is a flowchart 1000 illustrating a method of providing an image according to various embodiments.

Referring to FIG. 10, in operation 1001, according to an embodiment, the processor 340 may obtain an image via the camera module 320.

Operation 1001 is at least partially the same as or similar to operation 501 of FIG. 5, and thus detailed descriptions thereof will be omitted.

In operation 1003, according to an embodiment, the processor 340 may perform segmentation of the image obtained via the camera module 320, and may identify at least one first area respectively corresponding to at least one object included in the image.

Operation 1003 is at least partially the same as or similar to operation 503 of FIG. 5, and thus detailed descriptions thereof will be omitted.

In operation 1005, according to an embodiment, the processor 340 may identify whether at least one object detected from the image includes a designated object. For example, the processor 340 may identify whether the image obtained via the camera module 320 includes a designated object.

According to an embodiment, depending on whether the designated object is detected in the image, the processor 340 may determine one scheme between a first scheme that controls the exposure of the camera module 320 based on an object in the image (e.g., an exposure control scheme of the camera module 320 via operations 1007 to 1011) and a second scheme that controls the exposure of the camera module 320 based on a central area of the image (e.g., an exposure control scheme of the camera module 320 in operation 1013). According to an embodiment, the processor 340 may designate a person object (or a body object of a person or a skin object of a person) as an object used for selecting one scheme between the first scheme and the second scheme. The designated object to be used for determining one scheme between the first scheme and the second scheme may not be limited to a person object.

In FIG. 10, operation 1005 that identifies whether at least one object detected from the image includes a designated object and operation 1003 that identifies at least one first area respectively corresponding to at least one object included in the image by performing segmentation of the image obtained via the camera module 320 are illustrated as independent (separate) operations, but the disclosure is not limited thereto.

For example, operation 1005 may be included in operation 1003. The processor 340 may perform segmentation of the image obtained via the camera module 320, and may identify at least one object included in the image, thereby identifying whether the image includes a designated object.

In operation 1005, in the case in which the at least one object includes the designated object, the processor 340 may obtain brightness of the at least one first area in operation 1007 according to an embodiment.

Operation 1007 is at least partially the same as or similar to operation 505 of FIG. 5, and thus detailed descriptions thereof will be omitted.

In operation 1009, according to an embodiment, the processor 340 may identify at least one weight respectively corresponding to at least one object.

Operation 1009 is at least partially the same as or similar to operation 507 of FIG. 5, and thus detailed descriptions thereof will be omitted.

In operation 1011, according to an embodiment, the processor 340 may control the exposure of the camera module 320 based on the brightness of the at least one first area and the at least one weight, which respectively correspond to the at least one object.

Operation 1011 is at least partially the same as or similar to operation 509 of FIG. 5, and thus detailed descriptions thereof will be omitted.

In operation 1005, in the case in which the at least one object does not include the designated object (e.g., in the case in which the designated object is not detected in the image), the processor 340 may control the exposure of the camera module 320 based on the central area of the image in operation 1013 according to an embodiment. For example, in the case in which the image includes a plurality of patches, the processor 340 may set a higher weight for a patch closer to the center of the image with respect to the plurality of patches. The processor 340 may control the exposure of the camera module 320 based on the brightness of the plurality of patches and weights set for the plurality of patches.

Although FIG. 10 illustrates that the exposure of the camera module 320 is controlled based on the central area of the image in the case in which the designate object is not detected from the image, the disclosure is not limited thereto. For example, in the case in which the designated object is not detected in the image, the processor 340 may control the exposure of the camera module 320 based on the average brightness of the entire area of the image, or may control the exposure of the camera module 320 based on a predetermined area in the image.

Figure 11:
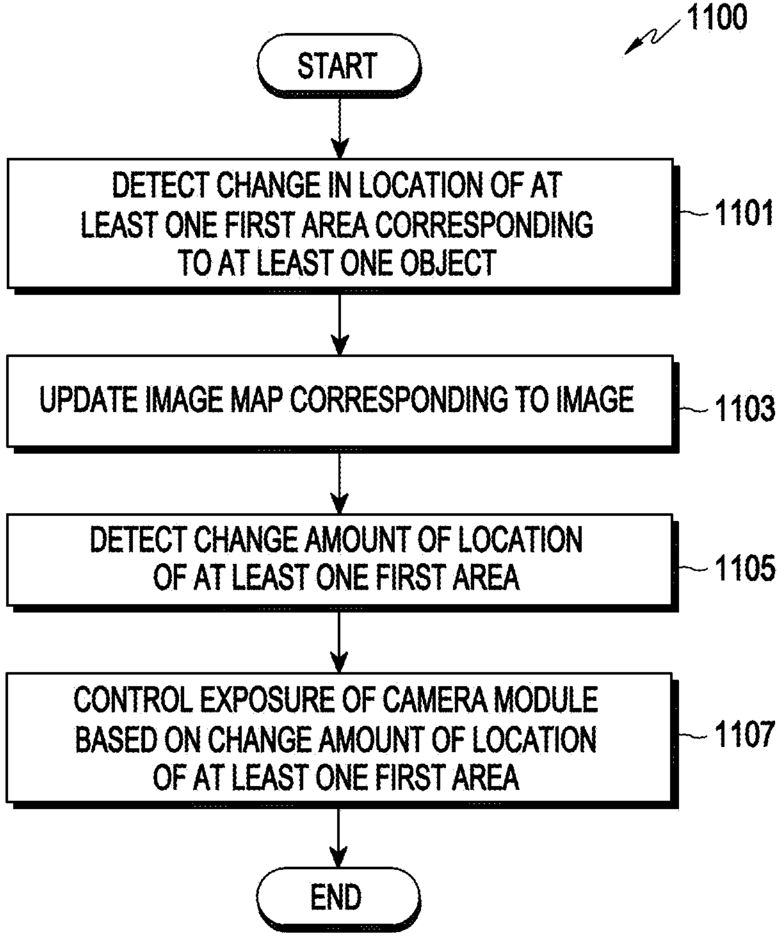
FIG. 11 is a flowchart illustrating a method of providing an image according to various embodiments.

FIG. 11 is a flowchart 1100 illustrating a method of providing an image according to various embodiments.

Figure 12:
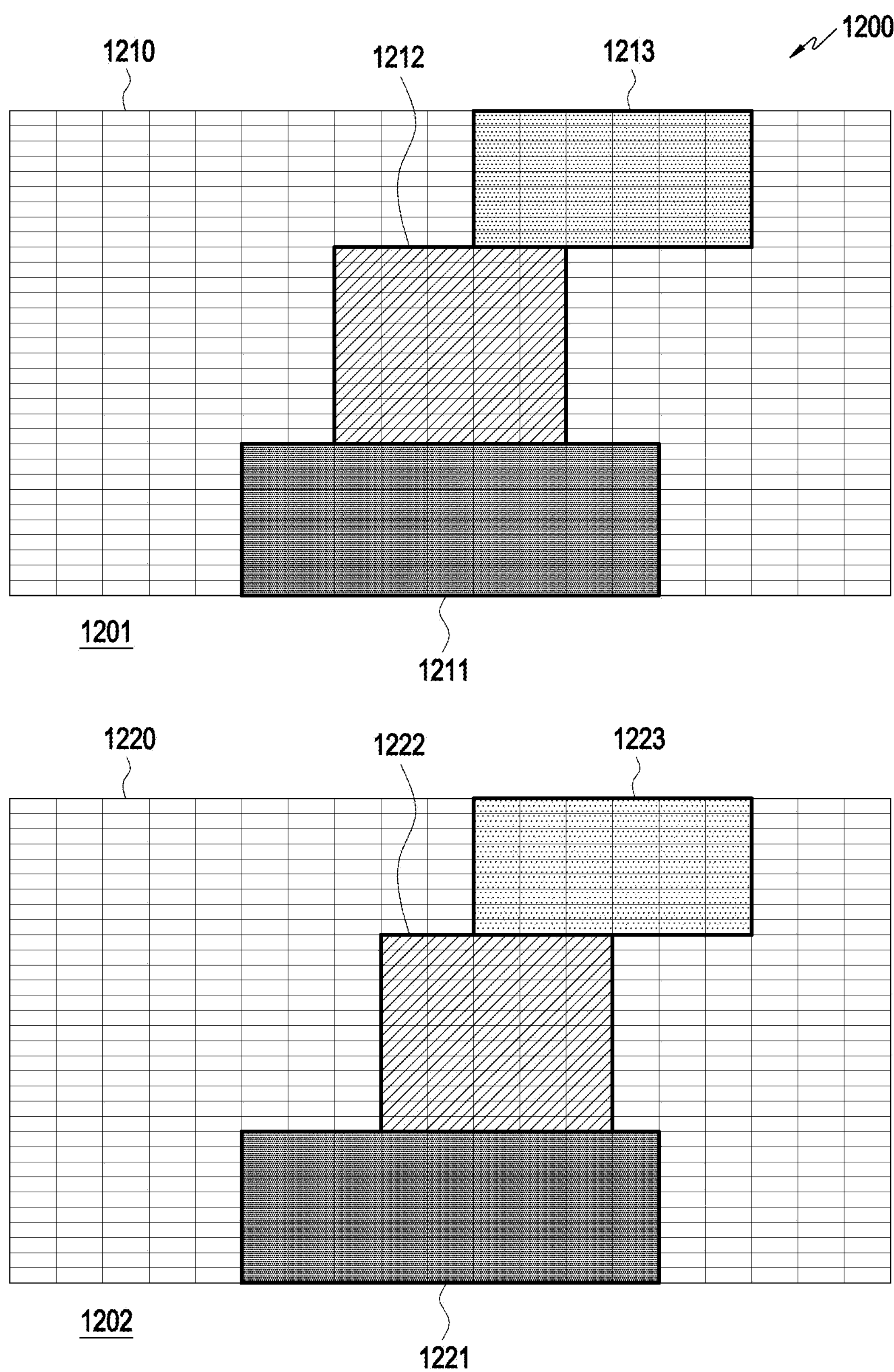
FIG. 12 is a diagram illustrating a method of providing an image according to various embodiments.

FIG. 12 is a flowchart 1200 illustrating a method of providing an image according to various embodiments.

Referring to FIG. 11 and FIG. 12, in operation 1101, according to an embodiment, the processor 340 may detect a change of a location of at least one first area corresponding to at least one object in an image. For example, the processor 340 may compare a location (e.g., coordinates of a first area in a first frame) of a first area corresponding to a first object detected in a first frame (e.g., a frame obtained before the current frame) which is obtained via the camera module 320 with a location (coordinates of the first area in a second frame) of the first area corresponding to the first object detected in a second frame (e.g., the current frame) subsequent to the first frame. In the case in which a difference between the location of the first area in the first frame and the location of the first area in the second frame is greater than or equal to a designated difference, the processor 340 may determine that the location of the at least one first area is changed.

According to an embodiment, in the case in which a change of the location of a designated object is greater than or equal to a designated location among the at least one object included in the image, the processor 340 may determine that the location of the at least one first area is changed. For example, in the case in which a change of the location of a person object (e.g., a body object, a skin object) is greater than or equal to a designated location among the at least one object included in the image, the processor 340 may determine that the location of the at least one first area is changed. As another example, although the image includes only a sky object and a change of the location of the sky object is greater than or equal to a designated location, the processor 340 may detennine that the location of the at least one first area is not changed.

In operation 1103, according to an embodiment, in the case in which the location of the at least one first area corresponding to at least one object in the image is determined as being changed, the processor 340 may update an image map corresponding to the image. For example, in the case in which the location of the at least one first area corresponding to the at least one object in the image is determined as being changed, the processor 340 may store the image map indicating the changed location (and image brightness) of the at least one first area in the memory 330.

In operation 1105, according to an embodiment, in the case in which the location of the at least one first area corresponding to the at least one object in the image is determined as being changed, the processor 340 may detect a location variation of the at least one first area.

According to an embodiment, in diagram 1201 of FIG. 12, an image map 1210 may be an image map corresponding to a first frame (e.g., a frame obtained before the current frame). In the image map 1210, a plurality of patches 1-1 1211 represents a first area corresponding to a body object, a plurality of patches 1-2 1212 represents a first area corresponding to a skin object, and a plurality of patches 1-3 1213 represents a first area corresponding to a sky object. According to an embodiment, in diagram 1202 of FIG. 12, an image map 1220 may be an image map corresponding to a second frame (e.g., the current frame). In the image map 1220, a plurality of patches 2-1 1221 represents the first area corresponding to the body object, a plurality of patches 2-2 1222 represents the first area corresponding to the skin object, and a plurality of patches 2-3 1223 represents the first area corresponding to the sky object.

According to an embodiment, based on the plurality of patches 1-1 1211 in the first frame and the plurality of patches 2-1 1221 in a second frame, the processor 340 may detect that the location of the first area corresponding to the body object is changed by a distance corresponding to a single patch (e.g., the width length of a single patch). Based on the plurality of patches 1-2 1212 in the first frame and the plurality of patches 2-1 1222 in the second frame, the processor 340 may detect that the location of the first area corresponding to the skin object is changed by a distance corresponding to a single patch. In this instance, the processor 340 may determine each of a location variation of the first area corresponding to the body object and a location variation of the first area corresponding to the skin object as a single patch distance.

Although the above-described examples illustrate that a location variation of at least one first area is detected, the disclosure is not limited thereto. According to an embodiment, the processor 340 may detect a direction in which the at least one first area changes, together with a location variation of the at least one first area. For example, in FIG. 12, the processor 340 may determine, as the right, a direction in which the first area corresponding to the body object and the first area corresponding to the skin object are changed.

According to an embodiment, the processor 340 may determine, as a location variation of a first area, a location variation of at least one patch located in the center of a plurality of patches among the plurality of patches included in the first area corresponding to an object. In this instance, the disclosure is not limited thereto, and the processor, for example, may determine, as the location variation of the first area, a location variation of a predetermined patch among the plurality of patches included in the first area corresponding to the object.

Although FIG. 12 illustrates a method of detecting a location variation of a first area corresponding to an object based on a change of locations of a plurality of patches of the first area corresponding to the object, the disclosure is not limited thereto. For example, based on a change of coordinates of pixels of a first area corresponding to an object, the processor 340 may detect a location variation of the first area corresponding to the object.

In operation 1107, according to an embodiment, based on the location variation of the at least one first area, the processor 340 may control the exposure of the camera module 320.

According to an embodiment, based on the location variation of the at least one first area, the processor 340 may set a shutter speed of the camera module 320 to be different. For example, as a location variation of at least one first area is high, the processor 340 may set a shutter speed of the camera module 320 to be high. As a location variation of at least one first area is low, the processor 340 may set a shutter speed of the camera module 320 to be low.

Referring to Table 3 given below, an operation in which the processor 340 sets a shutter speed of the camera module 320 based on a location variation of at least one first area will be described.

TABLE 3

| Location variation | 2 patches | 4 patches | 8 patches | 16 patches |
|---|---|---|---|---|
| Level of shutter speed | Level 1 | Level 2 | Level 3 | Level 4 |

According to an embodiment, in Table 3, "2 patches" denotes a first distance range that is greater than or equal to a distance corresponding to 2 patches (e.g., the width length of 2 patches) and less than a distance corresponding to 4 patches. "4 patches" denotes a second distance range that is greater than or equal to a distance corresponding to 4 patches and less than a distance corresponding to 8 patches. "8 patches" denotes a third distance range that is greater than or equal to a distance corresponding to 8 patches and less than a distance corresponding to 16 patches. "8 patches" denotes a fourth distance range that is greater than or equal to a distance corresponding to 8 patches. In Table 3, a shutter speed may correspond (or may be mapped) to a high speed in order of level 1, level 2, level 3, and level 4. For example, in Table 3, a shutter speed corresponding to level 1 is the lowest shutter speed and a shutter speed corresponding to level 4 is the highest shutter speed.

According to an embodiment, the processor 340 may store, in the memory 330, a table including a relationship between a location variation of a first area of an object and a shutter speed, as shown in Table 3. Based on a distance range corresponding to a location variation of a first area of an object, the processor 340 may set a shutter speed of the camera module 320 to be a shutter speed corresponding to the distance range. For example, in the case in which a location variation of a first area of an object corresponds to the first distance range, the processor 340 may set a shutter speed of the camera module 320 to be the shutter speed corresponding to level 1.

According to an embodiment, in the case in which an exposure value of the camera module 320 is determined via at least some of operations 501 to 509 of FIG. 5, the processor 340 may set sensitivity of an image sensor in consideration of the determined exposure value of the camera module 320 and the shutter speed set in operation 1107. For example, the processor 340 may determine an exposure value of the camera module 320 via at least some of operations 501 to 509 of FIG. 5. In the case in which a location variation of a first area corresponding to an object corresponds to the first distance range, the processor 340 may set the shutter speed corresponding to level 1. According to the determined exposure value of the camera module 320 and the shutter speed corresponding to level 1, the processor 340 may set a sensitivity value of the image sensor to be a first sensitivity value. In the case in which a location variation of a first area corresponding to an object corresponds to the fourth distance range, the processor 340 may set the shutter speed corresponding to be level 4. According to the determined exposure value of the camera module 320 and the shutter speed corresponding to level 4, the processor 340 may set a sensitivity value of the image sensor to be a second sensitivity value higher than the first sensitivity value.

According to an embodiment, as a location variation of a first area of an object is high, a shutter speed is set to be high, and thus the processor 340 may prevent an image from being blurred due to a movement of a subject (e.g., a person) of photographing when the image is displayed.

Figure 13:
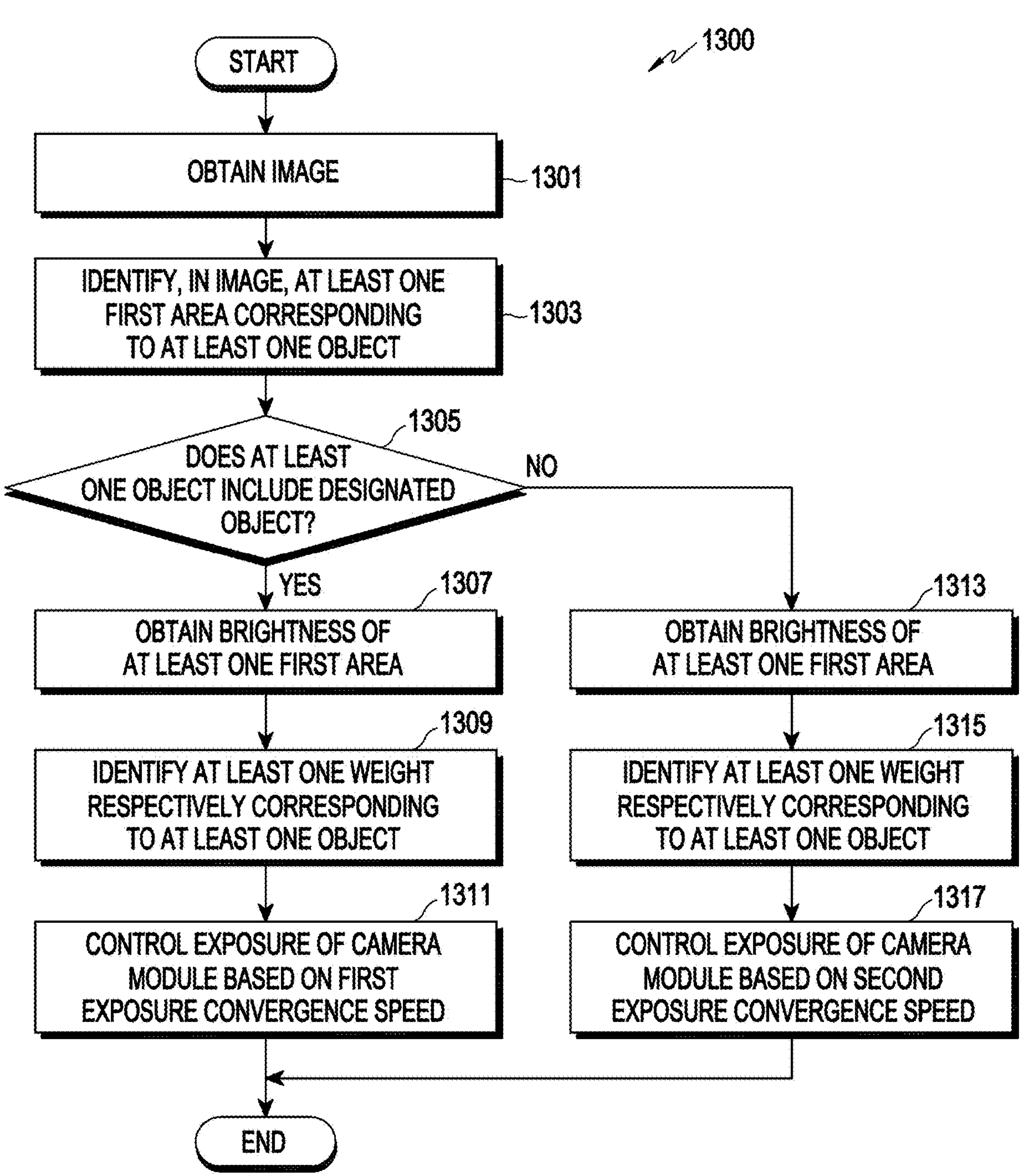
FIG. 13 is a flowchart illustrating a method of providing an image according to various embodiments.

FIG. 13 is a flowchart 1300 illustrating a method of providing an image according to various embodiments.

Referring to FIG. 13, in operation 1301, according to an embodiment, the processor 340 may obtain an image via the camera module 320.

Operation 1301 is at least partially the same as or similar to operation 501 of FIG. 5, and thus detailed descriptions thereof will be omitted.

In operation 1303, according to an embodiment, the processor 340 may perform segmentation of the image obtained via the camera module 320, and may identify at least one first area respectively corresponding to at least one object included in the image.

Operation 1303 is at least partially the same as or similar to operation 503 of FIG. 5, and thus detailed descriptions thereof will be omitted.

In operation 1305, according to an embodiment, the processor 340 may identify whether at least one object detected from the image includes a designated object. For example, the processor 340 may identify whether the image obtained via the camera module 320 includes the designated object (e.g., a person object, a body object of the person, or a skin object of the person).

In operation 1305, in the case in which the at least one object includes the designated object, the processor 340 may obtain brightness of the at least one first area in operation 1307 according to an embodiment.

Operation 1307 is at least partially the same as or similar to operation 505 of FIG. 5, and thus detailed descriptions thereof will be omitted.

In operation 1309, according to an embodiment, the processor 340 may identify at least one weight respectively corresponding to the at least one object.

Operation 1309 is at least partially the same as or similar to operation 507 of FIG. 5, and thus detailed descriptions thereof will be omitted.

In operation 1311, according to an embodiment, based on a first exposure convergence speed, the processor 340 may control the exposure of the camera module 320.

According to an embodiment, the processor 340 may obtain brightness of the image (e.g., brightness of the entire area of the image obtained via the camera module 320) based on the brightness of the at least one first area and the at least one weight which respectively correspond to the at least one object. Based on the brightness of the image and a target brightness, the processor 340 may determine an exposure value of the camera module 320.

According to an embodiment, in the case in which the designated object is included in the image, the processor 340 may set the exposure value of the camera module 320 based on the first exposure convergence speed. For example, as shown in Table 2, in the case in which the designated object is not included in the image, the processor 340 may set the exposure value of the camera module 320 so that the exposure value of the camera module 320 converges on a target exposure value of the camera module 320 via 4 stages from the currently set exposure value of the camera module 320. For example, as shown in Table 3, in the case in which the designated object is included in the image, the processor 340 may set the exposure value of the camera module 320 so that the exposure value of the camera module 320 converges on the target exposure value of the camera module 320 via 10 stages, which is greater than 4 stages, from the currently set exposure value of the camera module 320.

TABLE 4

| Time | t = 1 | t = 2 | t = 3 | t = 4 | t = 5 | t = 6 | t = 7 | t = 8 | t = 9 | t = 10 | t = 11 |
|---|---|---|---|---|---|---|---|---|---|---|---|
| Exposure value of camera module | 6 | 6.1 | 6.2 | 6.3 | 6.4 | 6.5 | 6.6 | 6.7 | 6.8 | 6.9 | 7 |
| Target exposure value | — | 7 | 7 | 7 | 7 | 7 | 7 | 7 | 7 | 7 | 7 |
| Exposure adjustment value | — | 0.9 | 0.8 | 0.7 | 0.6 | 0.5 | 0.4 | 0.3 | 0.2 | 0.1 | 0.0 |

According to an embodiment, in Table 4, the processor 340 may obtain an image via the camera module 320 of which an exposure value is set to be 6 at t=1. Based on the brightness of the obtained image and target brightness, the processor 340 may calculate an exposure adjustment value of 1 and a target exposure value of 7 by using Equation 3 and Equation 4. The processor 340 may set the exposure value of the camera module 320 to be 6.1 at t=2 (e.g., a time at which a subsequent frame is obtained after t=1 at which the current frame is obtained) so that the exposure value of the camera module 320 gradually converges on (becomes the same as) a target exposure value of 7 over time from the current exposure value of the camera module 320 set to be 6, as shown in the exposure values (e.g., 6.1 to 7) of the camera module 320 at t=2 to t=11 in Table 2. In Table 4, in the case in which t=1 is the point in time at which the current frame is obtained, t=2 may be the time at which a frame subsequent to the current frame is obtained via the camera module 320.

According to an embodiment, as the number of stages that the exposure value of the camera module 320 needs to pass to converge on the target exposure value is high (or as a time spent when the exposure value of the camera module 320 gradually converges on the target exposure value is long), it is understood that an exposure convergence speed is low. As the number of stages that the exposure value of the camera module 320 needs to pass to converge on the target exposure value is low (or as a time spent when the exposure value of the camera module 320 gradually converges on the target exposure value is short), it is understood that an exposure convergence speed is high.

According to an embodiment, in the case in which the designated object is included in the image, the processor 340 may set the exposure value of the camera module 320 based on the first exposure convergence speed. In the case in which the designated object is not included in the image, the processor 340 may set the exposure value of the camera module 320 based on a second exposure convergence speed which is higher than the first exposure convergence speed.

In the case in which the at least one object is identified as not including the designated object in operation 1305, the processor 340 according to an embodiment may obtain brightness of the at least one first area in operation 1313.

Operation 1313 is at least partially the same as or similar to operation 505 of FIG. 5, and thus detailed descriptions thereof will be omitted.

In operation 1315, according to an embodiment, the processor 340 may identify at least one weight respectively corresponding to the at least one object.

Operation 1315 is at least partially the same as or similar to operation 507 of FIG. 5, and thus detailed descriptions thereof will be omitted.

In operation 1317, according to an embodiment, based on the first exposure convergence speed, the processor 340 may control the exposure of the camera module 320.

According to an embodiment, based on the second exposure convergence speed higher than the first exposure convergence speed, the processor 340 may set the exposure value of the camera module 320. For example, as shown in Table 2, the processor 340 may set the exposure value of the camera module 320 (e.g., an exposure value to be applied to obtain a frame subsequent to the current frame) so that the exposure value of the camera module 320 converges on a target exposure value of the camera module 320 via 4 stages from the currently set exposure value of the camera module 320.

According to an embodiment, in the case in which the designated object is included in the image, the processor 340 may set the exposure value of the camera module 320 based on the first exposure convergence speed that is lower than the second exposure convergence speed that is set when the designated object is not included in the image, and thus the brightness of the image is gently changed when the designated object is included in the image. Through the above, the quality of the image that the user experience may be improved.

Although FIG. 13 illustrates that the exposure of the camera module 320 is controlled based on an object in an image even in the case in which the image does not include a designated object, as shown in operations 1313 to 1317, the disclosure is not limited thereto. For example, in the case in which an image does not include a designated object, the processor 340 may control the exposure of the camera module 320 based on a central area in the image and may set the exposure value of the camera module 320 based on the second exposure convergence speed as part of the operation of controlling the exposure of the camera module 320 based on the central area of the image, as shown in operation 1013 of FIG. 10.

In addition, although FIG. 13 illustrates that the processor 340 performs operation 1305 of identifying whether at least one object includes a designated object before operations 1307 and 1309 or operations 1313 and 1315, the disclosure is not limited thereto. For example, after performing an operation (operation 1307 or operation 1309) of obtaining the brightness of at least one first area corresponding to at least one object, and an operation (operation 1313 or operation 1315) of identifying at least one weight respectively corresponding to the at least one object, the processor 340 may identify whether the at least one object includes a designated object. The processor 340 may perform an operation of controlling the exposure of the camera module 320 based on the first exposure convergence speed, such as operation 1311, in the case in which the at least one object includes the designated object, and may perform an operation of controlling the exposure of the camera module 320 based on the second exposure convergence speed, such as operation 1317, in the case in which the at least one object does not include the designated object.

Figure 14:
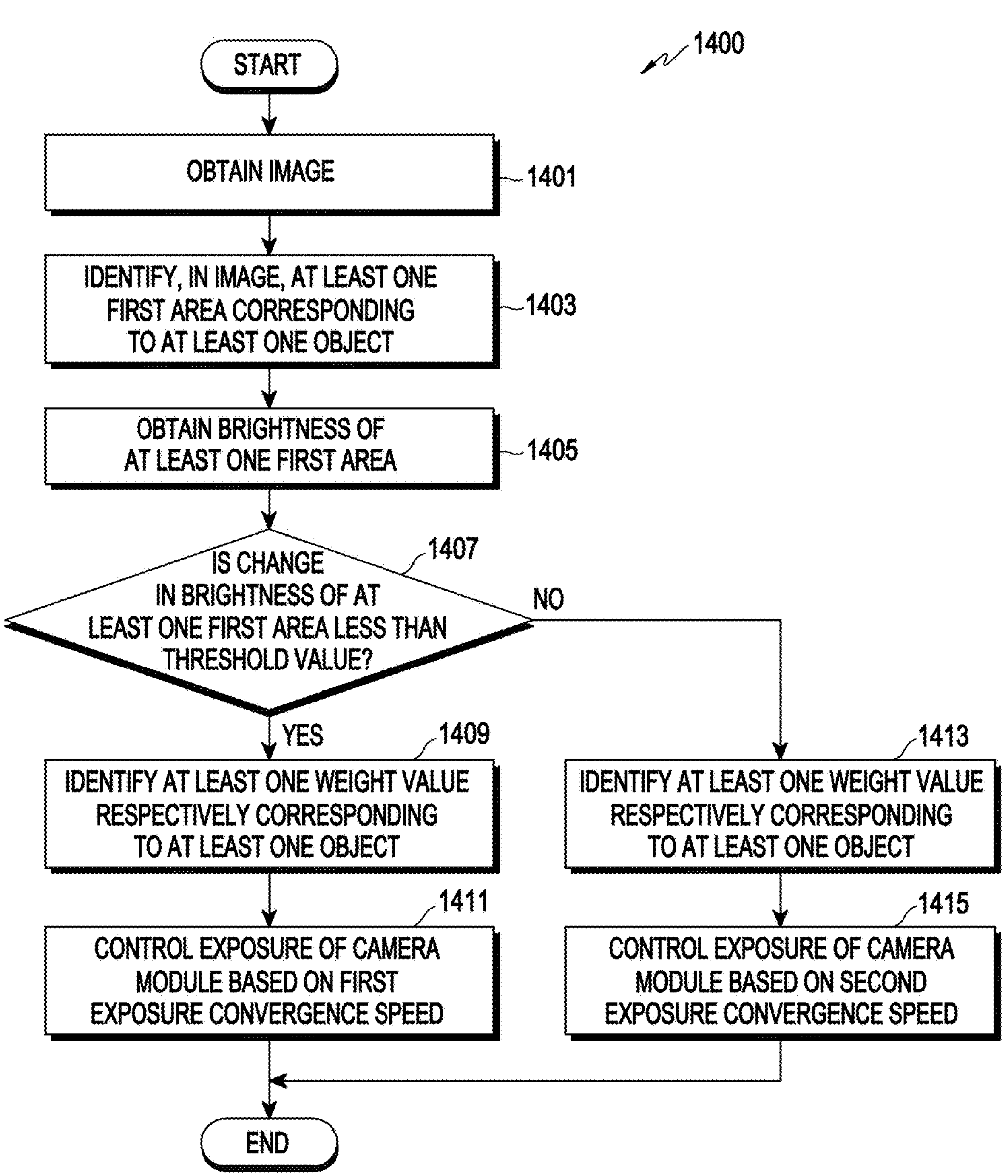
FIG. 14 is a flowchart illustrating a method of providing an image according to various embodiments.

FIG. 14 is a flowchart 1400 illustrating a method of providing an image according to various embodiments.

Referring to FIG. 14, in operation 1401, according to an embodiment, the processor 340 may obtain an image via the camera module 320.

Operation 1401 is at least partially the same as or similar to operation 501 of FIG. 5, and thus detailed descriptions thereof will be omitted.

In operation 1403, according to an embodiment, the processor 340 may perform segmentation of the image obtained via the camera module 320, and may identify, from the image, at least one first area respectively corresponding to at least one object included in the image.

Operation 1403 is at least partially the same as or similar to operation 503 of FIG. 5, and thus detailed descriptions thereof will be omitted.

In operation 1405, according to an embodiment, the processor 340 may obtain brightness of the at least one first area.

Operation 1405 is at least partially the same as or similar to operation 505 of FIG. 5, and thus detailed descriptions thereof will be omitted.

In operation 1407, according to an embodiment, the processor 340 may obtain whether a change of the brightness of the at least one first area is less than a threshold value.

According to an embodiment, the processor 340 identify whether a change in brightness of the at least one first area (or at least one first area and a background area in the image) is less than the threshold value. For example, by obtaining a difference between the brightness of the at least one first area in a first frame and the brightness of the at least one first area in a second frame, the processor 340 may identify a change in the brightness of the at least one first area in the image. The processor 340 may compare the identified change in the brightness of the at least one first area and the threshold value (e.g., a threshold brightness change), so as to identify whether the change in the brightness of the at least one first area is less than the threshold value.

According to an embodiment, the processor 340 may identify whether the change in the brightness of the at least one first area is less than a change in the brightness caused by a movement of at least one object (or a movement of a subject of photographing) included in the image. For example, in place of an operation of identifying whether the change in the brightness of the at least one first area is less than the threshold value, the processor 340 may identify whether the change in the brightness of the at least one first area is less than the change in the brightness caused by a movement of the at least one object included in the image.

According to an embodiment, the case in which the change in the brightness of the at least one first area is greater than the change in the brightness caused by a movement of the at least one object (or a movement of a subject of photographing) included in the image may correspond to the case in which the brightness of the image obtained via the camera module 320 is rapidly changed as a lighting device disposed around the electronic device 101 (e.g., in a photographing place) is switched from a turn-off state to a turn-on state (or as a lighting device is switched from a turn-off state to a turn-on state).

In the case in which the change in the brightness of the at least one first area is identified as being less than the threshold value (or in the case in which the change in the brightness of the at least one first area is identified as being less than the change in the brightness caused by a movement of the at least one object included in the image) in operation 1407, the processor 340 may identify at least one weight respectively corresponding to the at least one object in operation 1409 according to an embodiment.

Operation 1409 is at least partially the same as or similar to operation 507 of FIG. 5, and thus detailed descriptions thereof will be omitted.

In operation 1411, according to an embodiment, based on a first exposure convergence speed, the processor 340 may control an exposure speed of the camera module 320.

According to an embodiment, in the case in which the change in the brightness of the at least one first area is identified as being less than the threshold value (or in the case in which the change in the brightness of the at least one first area is identified as being less than the change in the brightness caused by a movement of the at least one object included in the image), the processor 340 may control the exposure of the camera module 320 based on the first exposure convergence speed which is slower than a second exposure convergence speed. The operation in which the processor 340 controls the exposure of the camera module 320 based on the first exposure convergence speed is at least partially the same as, or similar to operation 1311 of FIG. 13, and thus a detailed description thereof will be omitted.

In the case in which the change in the brightness of the at least one first area is identified as being greater than or equal to the threshold value (or in the case in which the change in the brightness of the at least one first area is identified as being greater than the change in the brightness caused by a movement of the at least one object included in the image) in operation 1407, the processor 340 may identify at least one weight respectively corresponding to the at least one object in operation 1413 according to an embodiment.

Operation 1413 is at least partially the same as or similar to operation 507 of FIG. 5, and thus detailed descriptions thereof will be omitted.

In operation 1415, according to an embodiment, the processor 340 may control an exposure speed of the camera module 320 based on a second exposure convergence speed.

According to an embodiment, in the case in which the change in the brightness of the at least one first area is identified as being greater than or equal to the threshold value (or in the case in which the change in the brightness of the at least one first area is identified as being greater than the change in the brightness caused by a movement of the at least one object included in the image), the processor 340 may control the exposure of the camera module 320 based on the second exposure convergence speed which is faster than the first exposure convergence speed. The operation in which the processor 340 controls the exposure of the camera module 320 based on the second exposure convergence speed is at least partially the same as, or similar to operation 1317 of FIG. 13, and thus a detailed description thereof will be omitted.

According to an embodiment, as described above, as a lighting device disposed in an environment around the electronic device 101 is switched from a turn-off state to a turn-on state (or from a turn-on state to a turn-off state), the processor 340 may control the exposure of the camera module 320 based on the second exposure convergence speed which is higher than the first exposure convergence speed.

According to an embodiment, although the image includes a designated object (e.g., a person object, a body object of the person, a skin object of the person), in the case in which the change in the brightness of the at least one first area is identified as being greater than or equal to the threshold value (or in the case in which the change in the brightness of the at least one first area is identified as being greater than the change in the brightness caused by a movement of the at least one object included in the image), the processor 340 may control the exposure of the camera module 320 based on the second exposure convergence speed which is faster than the first exposure convergence speed.

Figure 15:
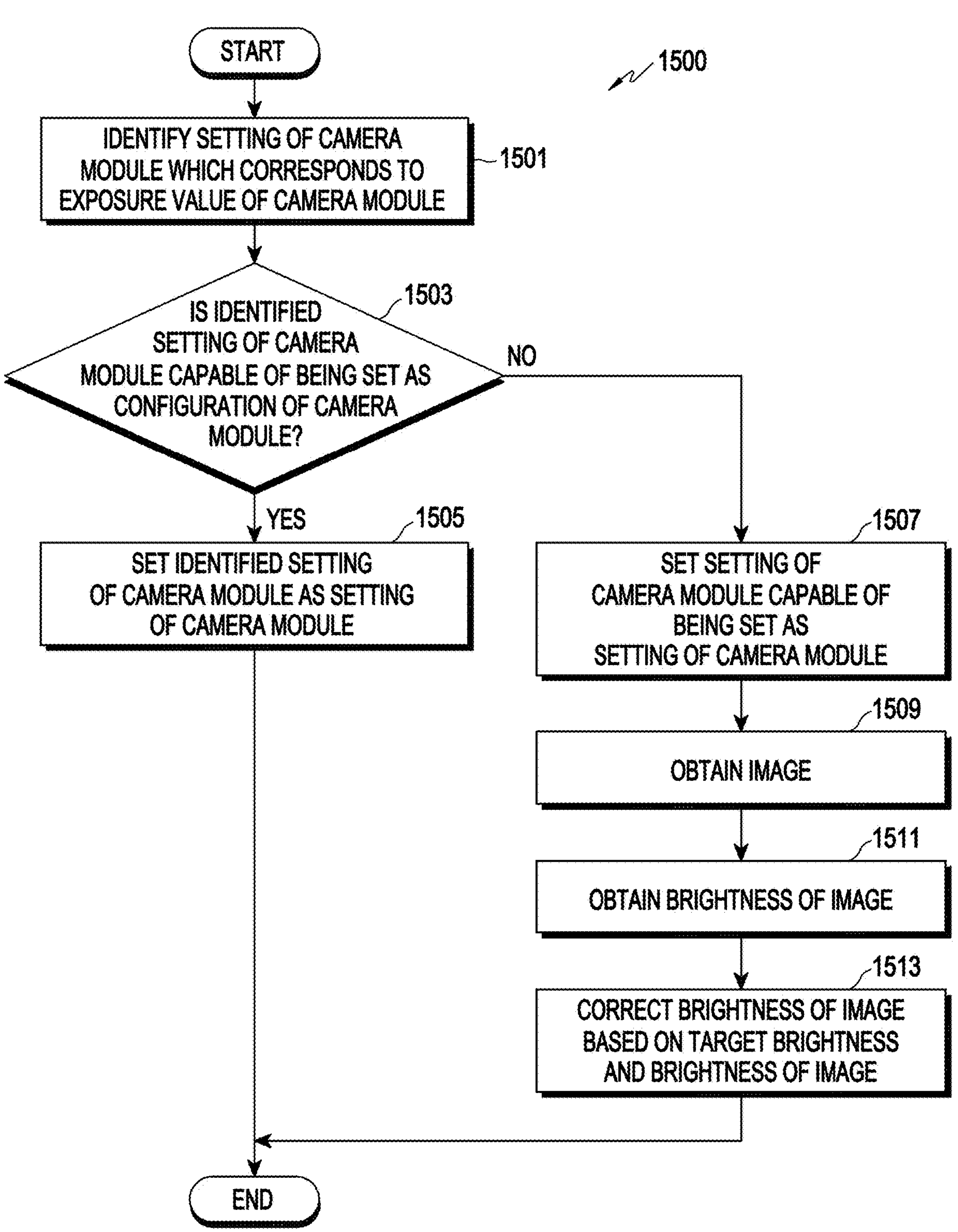
FIG. 15 is a flowchart illustrating a method of providing an image according to various embodiments.

FIG. 15 is a flowchart 1500 illustrating a method of providing an image according to various embodiments.

According to an embodiment, FIG. 15 includes operations performed after an operation of determining an exposure value based on the brightness of the image and the target brightness in operation 803 of FIG. 8.

In operation 1501, according to an embodiment, the processor 340 may identify a setting of the camera module 320 that corresponds to the exposure value of the camera module 320. For example, after the exposure value is determined based on the brightness of the image and the target brightness, the processor 340 may identify, based on the first line 910 and the second line 920 of FIG. 9, a value corresponding to a shutter speed and a value corresponding to sensitivity of an image sensor, which correspond to the determined exposure value.

In operation 1503, according to an embodiment, the processor 340 may identify whether the identified setting of the camera module 320 is capable of being set as a setting of the camera module 320.

According to an embodiment, the processor 340 may not set the setting of the camera module 320 to be the identified setting of the camera module 320 due to a restriction of hardware or software related to the camera module 320. For example, in the case in which the sensitivity value of the image sensor that corresponds to the exposure value of the camera module 320 is identified as 6400 and the sensitivity value of the image sensor of the camera module 320 is capable of being set up to a maximum of 3200, the processor 340 may identify that the identified setting of the camera module 320 is incapable of being set as the setting of the camera module 320. As another example, in the case in which the sensitivity value of the image sensor that corresponds to the exposure value of the camera module 320 is identified as 1600 and the sensitivity value of the image sensor of the camera module 320 is capable of being set up to a maximum of 3200, the processor 340 may identify that the identified setting of the camera module 320 is capable of being set as the setting of the camera module 320. As another example, in the case in which an exposure time of the camera module 320 that corresponds to the exposure value of the camera module 320 is identified as t1 and an exposure time capable of being set for the camera module 320 is t2 that is shorter than t1, the processor 340 may identify that the identified setting of the camera module 320 is incapable of being set as the setting of the camera module 320. As another example, in the case in which an exposure time of the camera module 320 that corresponds to the exposure value of the camera module 320 is identified as t3 and an exposure time capable of being set for the camera module 320 is t2 that is longer than t3, the processor 340 may identify that the identified setting of the camera module 320 is capable of being set as the setting of the camera module 320.

According to an embodiment, the processor 340 may identify whether the identified setting of the camera module 320 is capable of being set as the setting of the camera module 320, in consideration of the maximum value and/or the minimum value of a setting (e.g., a setting related to a shutter speed, a sensitivity of an image sensor, and/or an aperture value) which is related to an exposure and is capable of being set for the camera module 320. For example, in the case in which the identified setting of the camera module 320 falls within the range between the maximum value and the minimum value of the setting which is related to an exposure and is capable of being set for the camera module 320, the processor 340 may identify that the identified setting of the camera module 320 is capable of being set as the setting of the camera module 320. As another example, in the case in which the identified setting of the camera module 320 is greater than the maximum value or less than the minimum value of the setting which is related to the exposure and is capable of being set for the camera module 320, the processor 340 may identify that the identified setting of the camera module 320 is incapable of being set as the setting of the camera module 320.

In the case in which the processor 340 identifies that the identified setting of the camera module 320 is capable of being set as the setting of the camera module 320 in operation 1503, the processor 340, according to an embodiment, may set the identified setting of the camera module 320 as the setting of the camera module 320 (i.e., set an identified setting of the camera module 320 as the setting of the camera module 320) in operation 1505.

Operation 1505 is at least partially the same as or similar to the operation of controlling the exposure of the camera module 320 of operation 805 of FIG. 8, a detailed description will be omitted.

In the case in which the processor 340 identifies that the identified setting of the camera module 320 is incapable of being set as the setting of the camera module 320 in operation 1503, the processor 340 may set a setting of the camera module 320 capable of being set as the setting of the camera module 320 (i.e., set a setting of the camera module 320 that is capable of being set as the setting of the camera module 320) in operation 1507 according to an embodiment.

According to an embodiment, the processor 340 may set the maximum value or the minimum value of the setting which is related to an exposure and is capable of being set for the camera module 320, as the setting of the camera module 320. For example, in the case in which the sensitivity value of the image sensor that corresponds to the exposure value of the camera module 320 is identified as 6400 and the sensitivity value of the image sensor of the camera module 320 is capable of being set up to a maximum of 3200, the processor 340 may set the sensitivity value of the image sensor of the camera module 320 to be 3200.

In operation 1509, according to an embodiment, the processor 340 may obtain an image via the camera module 320 based on the setting (or setting) of the camera module 320 set in operation 1507.

In operation 1511, according to an embodiment, the processor 340 may obtain a brightness of the obtained image. For example, the processor 340 may obtain the brightness of the entire area of the obtained image.

In operation 1513, according to an embodiment, the processor 340 may correct the brightness of the image based on the target brightness and the brightness of the image (e.g., the brightness of the image obtained in operation 1511).

According to an embodiment, the processor 340 may calculate a difference (hereinafter, referred to as "delta Y") between the target brightness and the brightness of the image. The processor 340 may correct the brightness of the image by performing gamma correction and/or tone correction via tone mapping so that delta Y has the minimum value (e.g., "0"). For example, the processor 340 may perform gamma correction and/or tone correction via tone mapping so that the difference between the target brightness and the brightness of the image is the minimum value.

Figure 16:
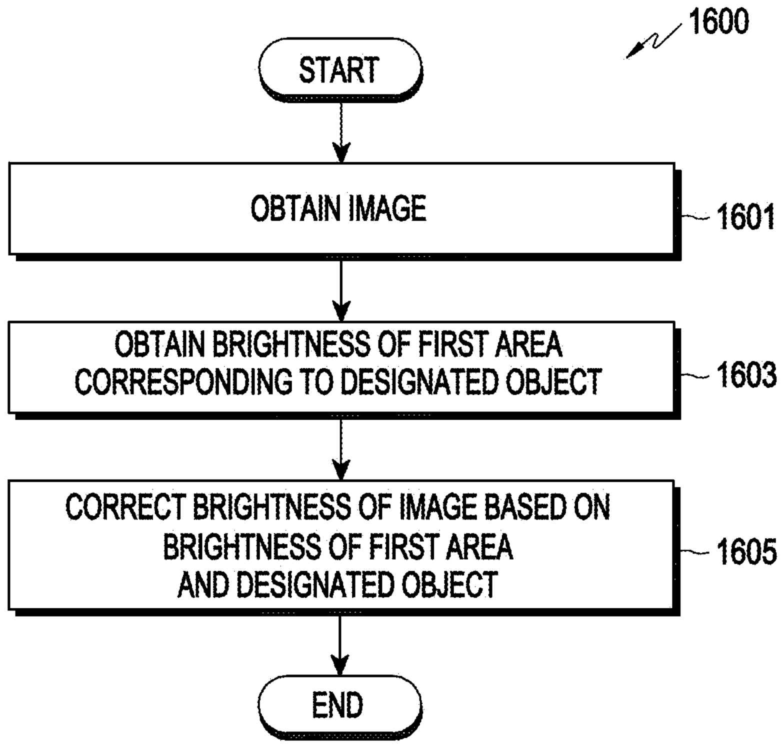
FIG. 16 is a flowchart illustrating a method of providing an image according to various embodiments.

FIG. 16 is a flowchart 1600 illustrating a method of providing an image according to various embodiments.

According to an embodiment, FIG. 16 includes operations performed after controlling the exposure of the camera module 320 of FIG. 5.

In operation 1601, according to an embodiment, the processor 340 may obtain an image via the camera module 320.

According to an embodiment, the processor 340 may obtain an image via the camera module 320 based on a setting of the camera module 320 that is set in relation to the exposure of the camera module 320 by performing the operations of FIG. 5. For example, by performing the above-described exposure convergence operation, the processor 340 may set the setting of the camera module 320 so that an exposure value of the camera module 320 has the same value as a target exposure value. After setting the setting of the camera module 320 that corresponds to the exposure value of the camera module 320 which is set to be the same as the target exposure value, the processor 340 may obtain an image via the camera module 320.

In operation 1603, according to an embodiment, the processor 340 may obtain the brightness of a first area corresponding to a designated object included in the image. For example, the processor 340 may perform segmentation, and may obtain the brightness of the first area corresponding to the designated object (e.g., a skin object).

According to an embodiment, the processor 340 may set a skin object included in a person object as the designated object. However, this is not limited thereto, and the processor 340 may set an object (e.g., a body object included in the person object) other than the skin object as the designated object.

In operation 1605, according to an embodiment, based on the brightness of the first area corresponding to the designated object and target brightness of the designated object, the processor 340 may correct brightness of the image.

According to an embodiment, the processor 340 may calculate a difference between the brightness of the first area corresponding to the designated object (e.g., the skin object) and the target brightness set for the designated object. The processor 340 may correct the brightness of the image by performing gamma correction and/or tone correction via tone mapping so that the difference between the brightness of the first area and the target brightness set for the designated object has the minimum value (e.g., "0"). For example, the processor 340 may perform gamma correction and/or tone correction via tone mapping so that the difference between the brightness of the first area corresponding to the designated object (e.g., skin object) and the target brightness set for the designated object is the minimum value (e.g., so that the brightness of the first area corresponding to the designated object is substantially the same as the target brightness of the designated object).

According to an embodiment, in the case in which a ratio of the first area corresponding to the designated object to the size of the image is less than or equal to a designated ratio (e.g., in the case in which the size of an area of the skin object is smaller than the size of the image), an image including an object having appropriate brightness may not be obtained via only an operation of setting the setting of the camera module 320. In this instance, via correcting, by the processor 340, the brightness of the image based on the brightness of the first area corresponding to the designated object (e.g., the skin object) and the target brightness of the designated object, an image including an object having an appropriate brightness may be obtained.

A method of providing an image by the electronic device 101 according to various embodiments of the disclosure may include identifying at least one area in the image by performing segmentation on the image, the at least one area respectively corresponding to at least one object included in the image, obtaining a brightness of the at least one area, identifying at least one weight respectively corresponding to the at least one object, and controlling an exposure of the camera module 320 based on the brightness of the at least one area and the at least one weight.

In various embodiments, the identifying of the at least one area may include detecting the at least one object included in the image by performing the segmentation on the image, and obtaining information associated with a location of the at least one detected object.

In various embodiments, the method may further include setting a plurality of weights for a plurality of objects, respectively, so that at least portions of the plurality of objects have different weights, and storing the plurality of objects and the plurality of weights in memory of the electronic device.

In various embodiments, the setting of the plurality of weights may include setting a weight for a person object, the weight for the person object being higher than a weight for another object among the plurality of objects.

In various embodiments, the setting of the weight for the person object may include setting the highest weight for a person object corresponding to a user of the electronic device 101 among a plurality of person objects.

In various embodiments, the setting of the exposure of the camera module 320 may include an operation of obtaining brightness of the image based on the brightness of the at least one area and the at least one weight, an operation of determining an exposure value of the camera module 320 based on the brightness of the image and a target brightness, and an operation of controlling the exposure of the camera module 320 based on the exposure value of the camera module 320.

In various embodiments, the method may further include identifying whether the at least one object includes a designated object, determining to control the exposure of the camera module 320 based on an object in the image in case the at least one object comprises the designated object, and determining to control the exposure of the camera module 320 based on a central area in the image in case the at least one object does not comprise the designated object.

In various embodiments, the method may further include detecting a change amount of a location of the at least one area, and the controlling of the exposure of the camera module 320 may include setting a shutter speed of the camera module 320 based on the change amount of the location of the at least one area.

In various embodiments, the method may further include identifying whether the at least one object includes a designated object, and the controlling of the exposure of the camera module 320 may include based on the at least one object including the designated object, controlling the exposure of the camera module 320 based on a first convergence speed, and based on the at least one object not including the designated object, controlling the exposure of the camera module 320 based on a second convergence speed higher than the first convergence speed.

In various embodiments, the method may further identifying whether a change of the brightness of the at least one area is less than a change of the brightness caused by a movement of the at least one object, and the controlling of the exposure of the camera module 320 may based on the change of the brightness of the at least one area being less than or equal to the change of the brightness caused by the movement of the at least one object, controlling the exposure of the camera module 320 based on a first convergence speed, and based on the change of the brightness of the at least one area being greater than the change of the brightness caused by the movement of the at least one object, controlling the exposure of the camera module 320 based on a second convergence speed higher than the first convergence speed.

In various embodiments, the method may further include after controlling the exposure of the camera module 320, obtain a subsequent image that is subsequent to the image via the camera module 320, obtaining brightness of an area corresponding to a designated object included in the subsequent image, and correcting brightness of the subsequent image based on the brightness of the image and a target brightness of the designated object.

In addition, the structure of data used in the above-described embodiments may be recorded in a computer-readable recording medium via various means. The computer-readable recording medium may include a storage medium such as a magnetic storage medium (e.g., a ROM, floppy disk, hard disk, or the like) and an optical reading medium (e.g., a CD-ROM, DVD, or the like).

The invention claimed is:

1. An electronic device comprising:

a camera;

at least one processor; and memory storing instructions that, when executed by the at least one processor individually or collectively, cause the electronic device to:

obtain an image via the camera, identify at least one area in the image by performing segmentation on the image, the at least one area respectively corresponding to at least one object included in the image, obtain a brightness of the at least one area, identify at least one weight respectively corresponding to the at least one object, and control an exposure of the camera based on the brightness of the at least one area and the at least one weight, wherein the instructions, when executed by the processor, further cause the electronic device to:

identify whether the at least one object includes a designated object, based on the at least one object including the designated object, control the exposure of the camera based on a first convergence speed, and based on the at least one object not including the designated object, control the exposure of the camera based on a second convergence speed higher than the first convergence speed.

2. The electronic device of claim 1, wherein the instructions, when executed by the at least one processor individually or collectively, cause the electronic device:

detect the at least one object included in the image by performing the segmentation on the image, and obtain information associated with a location of the at least one object.

3. The electronic device of claim 1, wherein the instructions, when executed by the at least one processor individually or collectively, further cause the electronic device to:

set a plurality of weights for a plurality of objects, respectively, so that at least portions of the plurality of objects have different weights, and store the plurality of objects and the plurality of weights in the memory.

4. The electronic device of claim 3, wherein the instructions, when executed by the at least one processor individually or collectively, cause the electronic device to set a weight for a person object, the weight for the person object being higher than a weight for another object among the plurality of objects.

5. The electronic device of claim 1, wherein the instructions, when executed by the at least one processor individually or collectively, cause the electronic device to:

obtain a brightness of the image based on the brightness of the at least one area and the at least one weight, determine an exposure value of the camera based on the brightness of the image and a target brightness, and control the exposure of the camera based on the exposure value of the camera.

6. The electronic device of claim 1, wherein the instructions, when executed by the processor, further cause the electronic device to:

based on the at least one object including the designated object, determine to control the exposure of the camera based on the at least one object in the image, and based on the at least one object not including the designated object, determine to control the exposure of the camera based on a central area the image.

7. The electronic device of claim 1, wherein the instructions, when executed by the at least one processor individually or collectively, further cause the electronic device to detect a change amount of a location of the at least one area, and wherein the instructions, when executed by the at least one processor, cause the electronic device to set a shutter speed of the camera based on the change amount of the location of the at least one area.

8. The electronic device of claim 1, wherein the instructions, when executed by the at least one processor individually or collectively, cause the electronic device to:

after controlling the exposure of the camera, obtain a subsequent image that is subsequent to the image via the camera, obtain a brightness of an area corresponding to a designated object included in the subsequent image, and correct a brightness of the subsequent image based on the brightness of the area and a target brightness of the designated object.

9. A method of providing an image in an electronic device, the method comprising:

obtaining an image via a camera of the electronic device;

identifying at least one area in the image by performing segmentation on the image, the at least one area respectively corresponding to at least one object included in the image;

obtaining a brightness of the at least one area;

identifying at least one weight respectively corresponding to the at least one object; and controlling an exposure of the camera based on the brightness of the at least one area and the at least one weight, wherein the method further comprises:

identify whether the at least one object includes a designated object;

based on the at least one object including the designated object, controlling the exposure of the camera based on a first convergence speed; and based on the at least one object not including the designated object, controlling the exposure of the camera based on a second convergence speed higher than the first convergence speed.

10. The method of claim 9, wherein the identifying of the at least one area comprises:

detecting the at least one object included in the image by performing the segmentation on the image; and obtaining information associated with a location of the at least one object.

11. The method of claim 9, further comprising:

setting a plurality of weights for a plurality of objects, respectively, so that at least portions of the plurality of objects have different weights; and storing the plurality of objects and the plurality of weights in memory of the electronic device.

12. The method of claim 11, wherein the setting of the plurality of weights comprises setting a weight for a person object, the weight for the person object being higher than a weight for another object among the plurality of objects.

13. The method of claim 9, wherein the controlling of the exposure of the camera comprises:

obtaining a brightness of the image based on the brightness of the at least one area and the at least one weight;

determining an exposure value of the camera based on the brightness of the image and a target brightness; and controlling the exposure of the camera based on the exposure value of the camera.

14. The method of claim 9, further comprising:

based on the at least one object including the designated object, determining to control the exposure of the camera based on the at least one object in the image; and based on the at least one Object not including the designated object, determining to control the exposure of the camera based on a central area in the image.

15. The method of claim 9, further comprising detecting a change amount of a location of the at least one area; and wherein the controlling of the exposure of the camera comprises:

setting a shutter speed of the camera based on the change amount of the location of the at least one area.

16. A non-transitory computer-readable storage medium having recorded thereon computer executable instructions, wherein the computer executable instructions that, when executed by at least one processor of an electronic device individually or Collectively, cause the electronic device to:

obtain an image via a camera of the electronic device, identifying at least one area in the image by performing segmentation on the image, the at least one area respectively corresponding to at least one object included in the image, obtain a brightness of the at least one area, identify at least one weight respectively corresponding to the at least one object, and control an exposure of the camera based on the brightness of the at least one area and the at least one weight, wherein the computer executable instructions, when executed by the at least one processor individually or collectively, further cause the electronic device to;

identify whether the at least one object includes a designated object, based on the at least one object including the designated object, control the exposure of the camera based on a first convergence speed, and based on the at least one object not including the designated object, control the exposure of the camera based on a second convergence speed higher than the first convergence speed.

* * * * *